United States Patent
Baras et al.

(10) Patent No.: US 8,848,904 B2
(45) Date of Patent: Sep. 30, 2014

(54) METHOD AND IMPLEMENTATION FOR INFORMATION EXCHANGE USING MARKOV MODELS

(75) Inventors: John S. Baras, Potomac, MD (US);
Paul L. Yu, Silver Spring, MD (US);
Brian M. Sadler, Laurel, MD (US)

(73) Assignees: University of Maryland, College Park, College Park, MD (US); The United States of America as represented by Secretary of the Army, Washington, DC (US)

( * ) Notice: Subject to any disclaimer, the term of this patent is extended or adjusted under 35 U.S.C. 154(b) by 790 days.

(21) Appl. No.: 12/605,167

(22) Filed: Oct. 23, 2009

(65) Prior Publication Data

US 2010/0272256 A1  Oct. 28, 2010

Related U.S. Application Data

(60) Provisional application No. 61/108,327, filed on Oct. 24, 2008.

(51) Int. Cl.
*H04K 1/10* (2006.01)
*H04N 21/266* (2011.01)
*H04L 9/08* (2006.01)

(52) U.S. Cl.
CPC ............ *H04K 1/10* (2013.01); *H04N 21/26613* (2013.01); *H04L 9/08* (2013.01)
USPC ........................................................ 380/34

(58) Field of Classification Search
CPC ....... H04K 1/10; H04N 21/26613; H04L 9/08
USPC .......................................................... 380/34
See application file for complete search history.

(56) References Cited

U.S. PATENT DOCUMENTS

| | | | | |
|---|---|---|---|---|
| 4,639,921 A | * | 1/1987 | Gang et al. | 714/807 |
| 4,888,800 A | * | 12/1989 | Marshall et al. | 380/281 |
| 6,078,281 A | * | 6/2000 | Milkovich et al. | 342/196 |
| 6,810,355 B1 | * | 10/2004 | Kreidler et al. | 702/173 |
| 7,024,553 B1 | * | 4/2006 | Morimoto | 713/163 |
| 7,120,696 B1 | * | 10/2006 | Au et al. | 709/229 |
| 7,657,036 B2 | * | 2/2010 | Hsu et al. | 380/281 |
| 7,684,565 B2 | * | 3/2010 | Medvinsky | 380/44 |
| 7,840,005 B2 | * | 11/2010 | Delp et al. | 380/201 |
| 8,086,850 B2 | * | 12/2011 | Ghosh | 713/163 |
| 2002/0078351 A1 | * | 6/2002 | Garib | 713/168 |
| 2002/0094081 A1 | * | 7/2002 | Medvinsky | 380/44 |

(Continued)

OTHER PUBLICATIONS

Stone et al., "Performance of Checksums and CRS's over Real Data", 1998.*

(Continued)

*Primary Examiner* — Ondrej Vostal
(74) *Attorney, Agent, or Firm* — Sterne, Kessler, Goldstein & Fox PLLC

(57) ABSTRACT

The replacement of secret keys is a central problem in key management. Typical solutions exchange handshaking messages, involve complex computations, or require the cooperation of trusted third parties. Disclosed herein is a key replacement method that exploits the randomness of Markov models to efficiently provide fresh keys to users. Unlike other methods, the proposed method removes the need for extra communications, intensive computation, or third parties. It is demonstrated that the proposed method has perfect forward secrecy as well as resistance to known-key attacks.

20 Claims, 15 Drawing Sheets

(56) References Cited

U.S. PATENT DOCUMENTS

| | | | | |
|---|---|---|---|---|
| 2002/0174366 | A1* | 11/2002 | Peterka et al. | 713/201 |
| 2003/0023847 | A1* | 1/2003 | Ishibashi et al. | 713/169 |
| 2003/0040852 | A1* | 2/2003 | Green et al. | 701/13 |
| 2004/0010699 | A1* | 1/2004 | Shao et al. | 713/189 |
| 2004/0017916 | A1* | 1/2004 | Staddon et al. | 380/277 |
| 2004/0073788 | A1* | 4/2004 | Kim et al. | 713/160 |
| 2004/0103036 | A1* | 5/2004 | Nilsson et al. | 705/20 |
| 2004/0109567 | A1* | 6/2004 | Yang et al. | 380/277 |
| 2004/0138811 | A1* | 7/2004 | Teranishi et al. | 701/213 |
| 2004/0162983 | A1* | 8/2004 | Gotoh et al. | 713/171 |
| 2004/0174260 | A1* | 9/2004 | Wagner | 340/568.1 |
| 2005/0039991 | A1* | 2/2005 | Severinsson | 188/72.1 |
| 2005/0058294 | A1* | 3/2005 | Chen et al. | 380/277 |
| 2006/0107050 | A1* | 5/2006 | Shih | 713/171 |
| 2006/0112431 | A1* | 5/2006 | Finn et al. | 726/22 |
| 2006/0195402 | A1* | 8/2006 | Malina et al. | 705/50 |
| 2006/0195610 | A1* | 8/2006 | Cole et al. | 709/245 |
| 2006/0227773 | A1* | 10/2006 | Grewal et al. | 370/389 |
| 2007/0260772 | A1* | 11/2007 | Garmonov et al. | 710/33 |
| 2007/0294435 | A1* | 12/2007 | Huang et al. | 709/251 |
| 2008/0005564 | A1* | 1/2008 | Agarwal | 713/171 |
| 2008/0016000 | A1* | 1/2008 | Bramhill et al. | 705/57 |
| 2008/0019527 | A1* | 1/2008 | Youn et al. | 380/278 |
| 2008/0037791 | A1* | 2/2008 | Jakobsson | 380/278 |
| 2008/0062984 | A1* | 3/2008 | Emeott et al. | 370/392 |
| 2008/0095368 | A1* | 4/2008 | Iida et al. | 380/259 |
| 2008/0165968 | A1* | 7/2008 | Yadav et al. | 380/270 |
| 2008/0181130 | A1* | 7/2008 | Balu et al. | 370/254 |
| 2008/0181408 | A1* | 7/2008 | Hird | 380/277 |
| 2008/0298592 | A1* | 12/2008 | Khalid et al. | 380/278 |
| 2009/0048978 | A1* | 2/2009 | Ginter et al. | 705/51 |
| 2009/0049308 | A1* | 2/2009 | Jin et al. | 713/187 |
| 2009/0097417 | A1* | 4/2009 | Asati et al. | 370/255 |
| 2009/0116646 | A1* | 5/2009 | Pippuri | 380/259 |
| 2009/0144551 | A1* | 6/2009 | Belenky | 713/175 |
| 2009/0150467 | A1* | 6/2009 | Neumann et al. | 708/254 |
| 2009/0224884 | A1* | 9/2009 | Tuttle | 340/10.1 |
| 2009/0224957 | A1* | 9/2009 | Chung et al. | 342/29 |
| 2009/0268908 | A1* | 10/2009 | Bikel et al. | 380/255 |
| 2009/0300358 | A1* | 12/2009 | Pang et al. | 713/171 |
| 2010/0008498 | A1* | 1/2010 | Shirai et al. | 380/44 |
| 2010/0020964 | A1* | 1/2010 | Horie | 380/44 |
| 2010/0180123 | A1* | 7/2010 | Kopetz | 713/176 |
| 2010/0293372 | A1* | 11/2010 | Fischer et al. | 713/168 |

OTHER PUBLICATIONS

Kent et al., "Security Architecture for the Internet Protocol", RFC 2401, 1998.*

Kohl et al., "The Kerberos Network Authentication Service (V5)", RFC 1510, 1993.*

Bellovin, S. M. and Merritt, M., "Encrypted Key Exchange: Password-Based Protocols Secure Against Dictionary Attacks," *Proceedings of the IEEE Symposium on Security and Privacy*, pp. 72-84, IEEE, United States (May 1992).

Blum, L., et al., "A Simple Unpredictable Pseudo-Random Number Generator," *SIAM Journal on Computing 15*(2):364-383, Society for Industrial and Applied Mathematics, United States (May 1986).

Cheriyan, J. and Mehlhorn, K., "Algorithms for dense graphs and networks on the random access computer," *Algorithmica 15*(6):521-549, Springer-Verlag New York Inc., United States (Jun. 1996).

Cooper, C. and Frieze, A., "The size of the largest strongly connected component of a random digraph with a given degree sequence," *Combinatorics, Probability and Computing 13*(3):319-337, Cambridge University Press, United Kingdom (May 2004).

Diffie, W. and Hellman, M. E., "New directions in cryptography," *IEEE Transactions on Information Theory IT-22*(6):644-654, IEEE, United States (Nov. 1976).

Fumy, W. and Landrock, P., "Principles of Key Management," *IEEE Journal on Selected Areas in Communications 111*(5):785-793, IEEE, United States (Jun. 1993).

Koblitz, N., "Elliptic Curve Cryptosystems," *Mathematics of Computation 48*(177):203-209, American Mathematical Society, United States (Jan. 1987).

Lamport, L., "Password Authentication with Insecure Communication," *Communications of the ACM 24*(11):770-772, Association for Computing Machinery, United States (1981).

Maurer, U.M., "Authentication Theory and Hypothesis Testing," *IEEE Transactions on Information Theory 46*(4):1350-1356, IEEE, United States (Jul. 2000).

Menezes, A. J., et al., *Handbook of Applied Cryptography*, CRC Press, Inc., Aug. 2001 (The 1996 print enclosed as an equivalent and obtained from http://www.cacr.math.uwaterloo.ca/hac/).

Miller, V. S., "Use of Elliptic Curves in Cryptography," *Lecture notes in Computer Sciences (CRYPTO 85)* 218:417-426, Springer-Verlag Berlin Heidelberg, Germany (1985).

Needham, R. and Schroeder, M., "Using encryption for authentication in large networks of computers," *Communications of the ACM 21*:993-999, Association for Computing Machinery, United States (1978).

Rivest, R. L., et al., "A Method for Obtaining Digital Signatures and Public-Key Cryptosystems," *Communications of the ACM 21*(2):120-126, Association for Computing Machinery, United States (1978).

Silverman, R.D., "A Cost-Based Security Analysis of Symmetric and Asymmetric Key Lengths," *RSA Labs.*, Bulletin 13, (Nov. 2001), accessed at http://www.rsa.com/rsalabs/node.asp?id=2088, on Jul. 26, 2010.

Tarjan, R., "Depth-first search and linear graph algorithms," *SIAM Journal on Computing 1*(2):146-160, Society for Industrial and Applied Mathematics, United States (1972).

Welch, L. R., "Hidden Markov Models and the Baum-Welch Algorithm," *IEEE Information Theory Society Newsletter 53*(4):1, 10-13, IEEE Information Theory Society, United States (Dec. 2003).

Yu, P. L., et al., "Key Exchange Using Markov Models," *IEEE Transactions*, pp. 1-13, University of Maryland, IS-2008-112, IEEE, United States (2008).

* cited by examiner

|  | 32 bits | 32 bits |
|---|---|---|
| Key 0 | Next Key | Next Key |
| Key 1 | Next Key | Next Key |
| . . . | . . . | . . . |
| Key k-1 | Next Key | Next Key |

FIG. 2

METHOD AND IMPLEMENTATION FOR INFORMATION EXCHANGE USING MARKOV MODELS

STATEMENT REGARDING FEDERALLY SPONSORED RESEARCH AND DEVELOPMENT

This invention was made with support under DAAD190120011 awarded by the Army Research Laboratory (ARL). The government has certain rights in the invention.

CROSS REFERENCE TO RELATED APPLICATIONS

This application claims benefit under 35 U.S.C. §119(e) to U.S. Provisional Patent Application No. 61/108,327, entitled "Method and Implementation for Key Generation and Replacement Using Markov Models," to Baras et al., filed Oct. 24, 2008, the entirety of which is hereby incorporated by reference as if fully set forth herein.

BACKGROUND OF THE INVENTION

1. Field of the Invention

The present invention is generally directed to systems, apparatuses, and methods for exchanging information. The present invention is more particularly directed to systems, apparatuses, and methods for exchanging information in a secure manner.

2. Background Art

The replacement of secret keys is a central problem in key management. The danger of a key being compromised increases with the duration of its use. (See W. Fumy and P. Landrock, "Principles of Key Management," *IEEE J. Sel. Areas Commun.*, vol. 111, no. 5, pp. 785-793, June 1993, the entirety of which is incorporated by reference herein.) For example, each act of authentication requires partial revelation of a secret key which can result in eventual compromise. (See U. M. Maurer, "Authentication Theory and Hypothesis Testing," *IEEE Trans. Inf. Theory*, vol. 46, no. 4, pp. 1350-1356, July 2000, the entirety of which is incorporated by reference herein.) Therefore, it is important to replace the key before it is compromised. However, unless efficient key replacement algorithms are used, significant overhead may be introduced into the system.

Secret keys are often used in symmetric encryption. Symmetric keys give the most security per bit (see R. D. Silverman, "A Cost-Based Security Analysis of Symmetric and Asymmetric Key Lengths," RSA Labs., Bulletin 13, November 2001, the entirety of which is incorporated by reference herein), followed by elliptic curve keys (see V. S. Miller, "Use of Elliptic Curves in Cryptography," *Lecture notes in Computer Sciences* (CRYPTO 85), vol. 218, pp. 417-426, 1985; N. Koblitz, "Elliptic Curve Cryptosystems," *Mathematics of Computation*, vol. 48, no. 177, pp. 203-209, January 1987, the entirety of each of which is incorporated by reference herein), and finally Rivest-Shamir-Adleman (RSA) keys give the least security per bit (see R. L. Rivest, A. Shamir, and L. Adleman, "A Method for Obtaining Digital Signatures and Public-Key Cryptosystems," *Communications of the ACM*, vol. 21, no. 2, pp. 120-126, 1978, the entirety of which is incorporated by reference herein). That is, for the same length key, a symmetric key system is harder to defeat than asymmetric, public-key based systems. Symmetric keys are typically used in high-rate applications since symmetric encryptions are generally much faster than asymmetric encryptions.

Traditional key replacement strategies fall under three paradigms:
1) Distribute secret keys over a secure channel that has limited availability.
2) Use third parties to help manage keys. This includes the use of public key infrastructures and key authorities.
3) Negotiate keys over an insecure channel.

Nonetheless, there exists a need for key replacement methods, and applications thereof, that not only meet security requirements, but also are efficient to allow more-frequent key replacements.

BRIEF SUMMARY OF THE INVENTION

The present invention meets the above-described needs by providing a system for exchanging information using Markov models, and applications thereof.

For example, an embodiment of the present invention provides an example method for sending information responsive to a variable that changes over time. According to this example method, a message is provided responsive to a current variable. A plurality of potential next variables are generated based on a transition function that specifies a transition probability from the current variable to other variables, wherein the transition probability from the current variable to each potential next variable is greater than zero. One of the plurality of potential next variables is assigned as a next variable. A subsequent message is provided responsive to the next variable.

Another embodiment of the present invention provides an example method for receiving information responsive to a variable that changes over time. According to this example method, a message is received responsive to a current variable. A plurality of potential next variables are generated based on a transition function that specifies a transition probability from the current variable to other variables, wherein the transition probability from the current variable to each potential next variable is greater than zero. A next variable is identified based on an integrity check of each potential next variable. A subsequent message is received responsive to the next variable.

A further embodiment of the present invention provides a transmitter for sending information responsive to a variable that changes over time. The transmitter includes a message-generation module, a variable-generation module, and an assignment module. The message-generation module is configured to provide a message responsive to a current variable. The variable-generation module is configured to generate a plurality of potential next variables based on a transition function that specifies a transition probability from the current variable to other variables, wherein the transition probability from the current variable to each potential next variable is greater than zero. The assignment module is configured to assign one of the plurality of potential next variables to be a next variable. The message-generation module is then configured to provide a subsequent message responsive to the next variable.

A still further embodiment of the present invention provides a receiver for receiving information responsive to a variable that changes over time. The receiver includes a reception module, a variable-generator module, and a variable-identifier module. The reception module is configured to receive a current message responsive to a current variable. The variable-generator module is configured to generate a plurality of potential next variables based on a transition function that specifies a transition probability from the current variable to other variables, wherein the transition probability from the current variable to each potential next variable is greater than zero. The variable-identifier module is configured to identify a next variable based on an integrity check of each potential next variable. The reception module is then configured to receive a subsequent message responsive to the next variable.

A still further embodiment of the present invention provides a system, comprising a transmitter for sending information responsive to a variable that changes over time and a receiver for receiving information responsive to the variable that changes over time.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 2 illustrates a fully specified Markov model with 32-bit keys, a total of $2^{32}$ states, and a branching factor of 2, wherein such a Markov model requires at least one gigabyte of memory to store.

Figure 1:
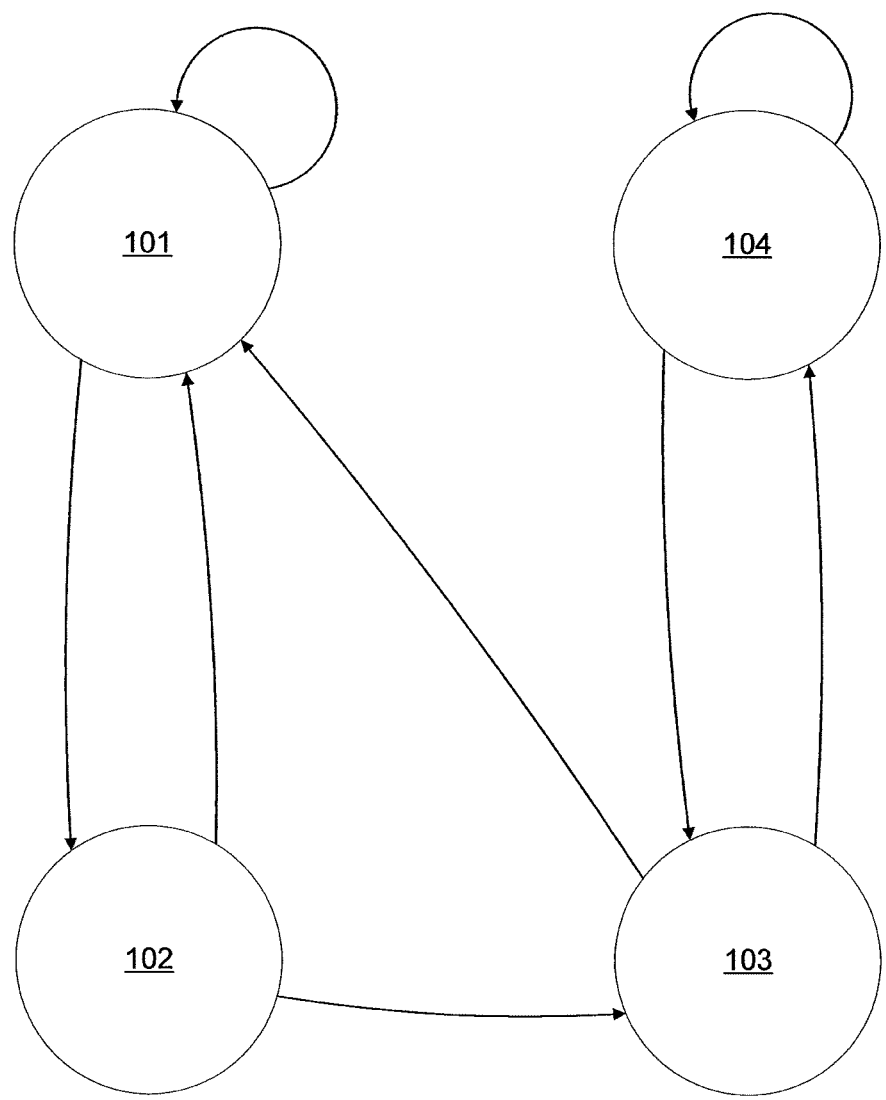
FIG. 1 illustrates an example Markov model with a total of four states, wherein a current state may transition into two possible states.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Overview

Embodiments of the present invention are directed to information exchange using Markov models, and applications thereof. As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An embodiment of the present invention provides a method for sending and receiving information responsive to a variable that changes over time. This method has applications in cryptography, frequency-hopping communication systems, or in other applications in which information is exchanged responsive to a variable that changes over time. For example, the variable may be (i) a session key used to encrypt and decrypt messages, (ii) a carrier frequency used to transmit and receive data, or (iii) another variable, associated with information exchange, that changes over time.

According to this method, during a current epoch, a sending party provides information responsive to a current variable; and during a subsequent epoch, the sending party provides information responsive to a next variable. For example, during the current epoch, the sending party may encrypt a message using a current session key or may transmit a message using a current carrier frequency; and during the subsequent epoch, the sending party may encrypt a subsequent message using a next session key or may transmit a subsequent message using a next carrier frequency. In order for a receiving party to properly receive the messages sent by the sending party, the receiving party must use the appropriate variable during the appropriate epoch. In a cryptography application, for example, the receiving party must use the current session key to decrypt messages during the current epoch and must use the next session key to decrypt messages during the subsequent epoch. In a frequency-hopping application, as another example, the receiving party must use the current carrier frequency during the current epoch and must use the next carrier frequency during the subsequent epoch.

As used herein, an "epoch" reference to a time period during which information is sent and/or received. Each epoch may comprise a fixed interval of time or variable intervals of time.

Rather than assuming the availability of a secure channel or trusted third parties for communicating how the variable changes from one epoch to the next, embodiments of the present invention provide systems, apparatuses, and methods that enable a receiving party to determine a next variable by using a random access Markov model. According to embodiments, the sending party and receiving party may independently generate transitions of the random access Markov model by using a long-term variable (e.g., long-term key) and a current variable (e.g., current key). However, the random access Markov models of embodiments of the present invention are of sufficient complexity that it is not feasible for such models to be stored in memory, thereby reducing the possibility that an adversary may be able to deduce the long- and short-term variables through brute-force efforts.

For illustrative purposes only, and not limitation, embodiments of the present invention will be described herein in the context of cryptography. That is, in the description that follows, the variable will be described as a key, and the change of that variable will be described as key replacement. A person skilled in the relevant art(s) will appreciate, however, that methods of embodiments of the present invention may be utilized in other applications (e.g., frequency-hopped communications systems) in which information is exchanged responsive to a variable that changes from one epoch to another.

In the context of cryptography, a method in accordance with an embodiment of the present invention exploits the randomness of Markov models to efficiently provide secure key replacements to users (e.g., sending parties and receiving parties). Unlike other methods, this method removes the need for:

explicit communication between sender and receiver;
the presence and cooperation of trusted third parties; and
large storage requirements.

The security of this example key replacement method is quantified based on key equivocation. With careful selection of parameters, security can be very high with only modest communication, computation, and memory requirements. In particular, it is difficult for adversaries to deduce the current session key. Further, even when an adversary is able to deduce the current session key, the adversary is unable to gain significant advantage in deducing past or future keys.

II. Example Environment

Any key replacement method should satisfy certain security requirements in order to be useful. Methods that are also efficient allow for more frequent key replacements. Described below are (A) example security requirements and (B) example efficiency metrics.

A. Key Security

Key replacement is described herein in terms of the following scenario: a sending party (e.g., Alice) and a receiving party (e.g., Bob) share a pre-distributed secret key l and use it to generate session keys $\{k_i\}$. They use the session key $k_i$ to encrypt their messages in the $i^{th}$ epoch. Occasionally, they wish to replace it with a fresh (e.g., new) key. The key l is a long-term key and is rarely replaced. The session keys $\{k_i\}$ are short-term keys and are replaced relatively often.

There is an adversary who wants to deduce the secret keys (long- or short-term) given her observations of the encrypted messages. Of interest is the adversary's ability to deduce the secret keys both as an outsider and as a one-time insider. As used herein, an outsider is an entity that knows only what is generally available (e.g., the key replacement method), but not privileged information (e.g., any of the keys). A one-time insider is an entity that has access to privileged information (e.g., one or more keys). A one-time insider gains privileged information at only one point in time. In particular, when the adversary is a one-time insider, potential issues are the secrecy of past keys (perfect forward secrecy) and future keys (susceptibility to known-key attacks). (See A. J. Menezes, P. C. van Oorschot, and S. A. Vanstone, *Handbook of Applied Cryptography*, CRC Press, 2001, the entirety of which is incorporated by reference herein.)

Perfect forward secrecy refers to the protection of past session keys given the compromise of the long-term key. That is, if the adversary obtains l at time i, she is unable to infer the session keys $\{k_0, \ldots, k_{i-1}\}$. In comparison, the resistance of the method to known-key attacks refers to the protection of future session keys given the knowledge of past session keys (but no knowledge of the long-term key). Taken together, these two requirements state that in the event of a key breach, the adversary is able to recover past or future session keys with only a small probability.

B. Replacement Efficiency

The efficiency of a key replacement algorithm or method can be quantified in a variety of ways:

Number and bandwidth of messages required;
Complexity of computation at the sending party and the receiving party, measured by number of simple operations; and/or
Size of storage and memory requirements.

Disclosed herein is an example method that does not require explicit key replacement communication or unreasonable memory requirements. This example method uses Markov models in a synchronized way to choose the replacement keys. However, this introduces a tradeoff because the security of this method depends on the unpredictability of pseudo-random number generators (PRNGs). In practice, it is difficult to have truly unpredictable PRNGs and existing implementations require non-trivial computation. Hence while this method improves the communication overhead and memory requirements, it does so at the expense of requiring some non-trivial computations.

In general, secure methods require non-trivial computations. In Section III, methods in accordance with embodiments of the present invention are contrasted with some existing key exchange methods, exploring the various tradeoffs between efficiency and security.

III. Markov Key Replacement Method

Suppose that the sending party and the receiving party have identical Markov models in the same state. Let each state of the model correspond to a session key. Assume that the sending party and the receiving party synchronize their key replacements. For example, they may agree to change their keys at regular time intervals. An example key replacement method in accordance with an embodiment of the present invention is introduced below with a simple example.

A. Illustrating Example

Let the sending party and the receiving party agree upon the Markov model shown in FIG. 1. As illustrated in FIG. 1, this Markov model includes four states, labeled 101, 102, 103, and 104. Each state represents a unique session key. Suppose that the sending party and the receiving party are currently using key 102. At the next key replacement time, the sending party starts to use either key 101 or key 103 with equal probability. Suppose the sending party chooses key 101.

The receiving party, having both the model and the current key, knows that the replacement key is either 101 or 103. He is able to determine which key is correct by checking the message integrity (detailed below) for each key. After the integrity check, the receiving party knows that the sending party is using key 101 and starts to use key 101.

The sending party and the receiving party thus regain synchrony. At the next key transition, the above steps are repeated.

The states and possible transitions are shown in FIG. 1, while a corresponding probability matrix for these states is shown below:

$$\begin{pmatrix} .5 & .5 & 0 & 0 \\ .5 & 0 & .5 & 0 \\ .5 & 0 & 0 & .5 \\ 0 & 0 & .5 & .5 \end{pmatrix}$$

The following sections describe how the session keys are used to encrypt messages and how the receiving party determines if he is using the correct key. Then, the specification and construction of the Markov model are detailed, and their use is described in the context of the sending party's and the receiving party's key replacement algorithms. Finally, an analysis of the complexity and costs of this example method are described.

B. Message Model

The superscripts a, b are used herein to denote the influence or ownership of the sending party or the receiving party, respectively.

During key epoch i, the sending party forms the ciphertext $x_i$ by encrypting the message $s_i^a$ with her session key $k_i^a$ $$x_i = f_e(s_i^a, k_i^a) \tag{1}$$

and the receiving party recovers the message by decrypting the cipher-text with his key $$s_i^b = f_d(x_i, k_i^b) \tag{2}$$

The encryption and decryption functions satisfy $$s = f_d(f_e(s,k),k) \tag{3}$$

and hence the sending party and the receiving party can communicate when $k_i^a = k_i^b$.

Assume that the message includes an integrity check (e.g., checksum), so that the receiver knows when the message is received correctly ($s_i^b = s_i^a$). For example, the message may be appended with a CRC-32 (cyclic redundancy check), which will match when the correct key is used to decrypt. Writing the integrity check as $\psi(\cdot)$, yields $$\psi(x_i, k) = \begin{cases} 0 \Rightarrow s_i^a \neq s_i^b \text{ or } k_i^a \neq k \\ 1 \Rightarrow s_i^a = s_i^b \text{ and } k_i^a = k \end{cases} \tag{4}$$

That is, when the integrity check fails ($\psi(\cdot)=0$), the receiving party is certain that the message is received in error or that the keys are mismatched. Conversely, when the integrity check passes, the receiving party knows that the message and key are both correct. Therefore, the receiving party can use the outcome of $\psi(\cdot)$ to determine if he is using the correct key.

For clarity of the following discussion, assume that a passed integrity check implies perfect message reception with the correct key. However, in actuality there may be a non-zero probability that an incorrect key or message can lead to a passed integrity check. For instance, it is possible to pass a CRC check when the incorrect key was used to decrypt. Section VI elaborates on the effect of such errors.

C. Family of Markov Models

The sending party and the receiving party choose the same Markov model from a large family of models. The chosen model may be viewed as the long-term key shared by the sending party and the receiving party. They use this model to determine the subsequent session keys that they will use to encrypt their traffic. Clearly, there may be many possible models and many possible session keys to choose from. Otherwise, the adversary may be able to deduce the long- and short-term keys through brute-force efforts.

Described below are the specifications of the Markov models. Although the transition matrices are sparse, the storage requirements for even a single model are prohibitively large. According to an embodiment, the hurdle of the prohibitively large Markov models is overcome by presenting a random-access algorithm that removes the need to store the entire family of models in memory.

1) Markov Model Specification: Denote a Markov model by $\lambda=(A,\pi)$, where A is the transition probability matrix and $\pi$ contains the initial key probabilities. Suppose that the session keys are drawn from a keyspace $\kappa$ with size K, i.e., $|\kappa|=K$. Then A is a K×K matrix and $\pi$ is a K×1 column vector. A(m, n) is the probability of transitioning from key m to key n, and $\pi(m)$ is the probability of starting with key m.

For initialization purposes, the choice of model $\lambda$ determines the initial key $k_0$. That is, $\pi$ is non-zero for exactly one entry.

$$\sum_m I(\pi(m)) = 1 \tag{5}$$

where $I(\cdot)$ is the indicator function.

To limit the complexity of the receiver (Section III-C2), the models are restricted so that each key can transition to one of exactly d possible keys. The parameter d is called the branching factor of the model.

The key transitions are equiprobable. That is, if a transition from key m to n exists, it is taken with probability 1/d.

$$\sum_n I(A(m,n)) = d, \forall m \tag{6}$$

$$A(m,n) \in \left\{0, \frac{1}{d}\right\}, \forall m, n \tag{7}$$

In general there is an entire family of Markov models that the sending party and the receiving party could choose from. Let the models be drawn from a collection A with equal probability 1/L, where $|\Lambda|=L$.

2) Construction: A single Markov model requires O(dK) memory, since limiting the branching factor d makes the number of total transitions linear in K. For 32-bit keys with branching factor 2, the model requires at least 1 gigabyte of memory, as illustrated in FIG. 2.

Storing the entire family of L Markov models thus requires O(dKL), and quickly becomes infeasible when L or K grow large. Even with small key sizes $L=K=2^{32}$ and a modest branching factor of d=2, the storage requirement is approximately $2^{32+32+1}$, or 4.3 billion gigabytes. Clearly, storing entire models in memory is not feasible when realistic values for key length and number of keys are considered.

Note that in order for the algorithm to run, the sending party and the receiving party only need to know the current key and the possible replacement keys. Therefore, they only need to store these values in memory. Of importance, therefore, is a Markov model where the sending party and the receiving party are able to directly access the transition probabilities for a given key without having to store the entire model in memory.

Figure 3:
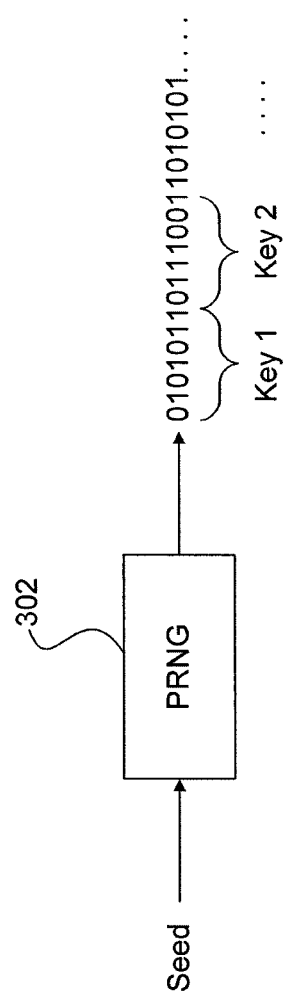
FIG. 3 illustrates construction of a random access Markov model, wherein a pseudo-random number generator generates key transitions from a current key in accordance with an embodiment of the present invention.
Figure 4B:
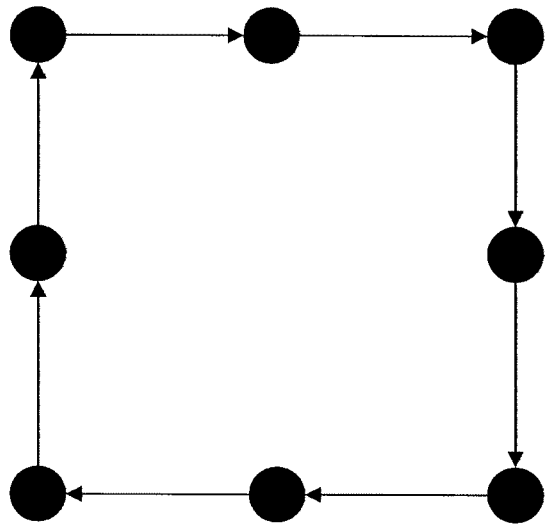
FIG. 4B illustrates a periodic graph.
Figure 4A:
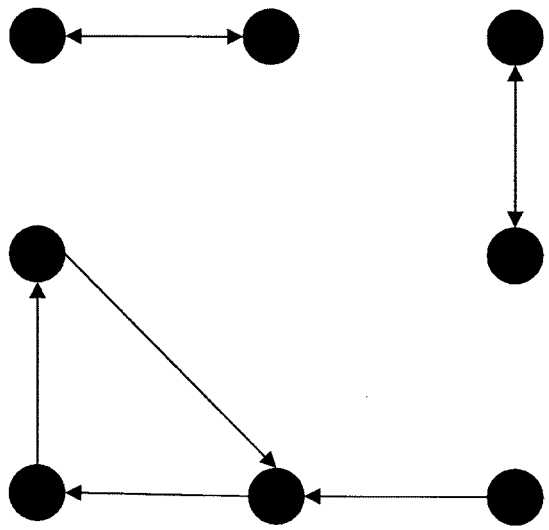
FIG. 4A illustrates a graph with a small reachable subspace.

Assume m-bit keys. Given the current key j, how do the sending party and the receiving party find the set of possible next keys? One possibility is outlined below and illustrated in FIG. 3.

1) Seed a pseudo-random number generator (PRNG) 302 with a value $f(1,j)$, where l is the key that chooses the model $\lambda$ and i is the current key. For example, $f(\cdot)$ might be specified by $f(1,j)=K*1+j$.
2) Until there are d unique keys, select m-bit segments of the output of PRNG 302. Each chunk corresponds to a candidate next key.
3) The transition probabilities of each candidate key are 1/d.

Since $\pi$ chooses a single initial key, it is easy to specify. One possibility is to always choose the first key reachable from key 0. The requirements of PRNG 302 are described in Section IV.

For the remainder of this disclosure, it is assumed that randomly generated Markov models are used.

D. Key Replacement Algorithm

Before presenting key replacement algorithms of embodiments of the present invention, the goal of such key replacements, in terms of key synchrony, are described.

Definition 1: The keys of the sending party and the receiving party are synchronized for n key epochs when $$k_i^a = k_i^b, \quad 0 \leq i < n \quad (8)$$

Definition 2: The time-to-failure of the method is $n_0$, where $$n_0 = \arg\min_i k_i^a \neq k_i^b \quad (9)$$

Clearly, $n_0 > 0$ since the initial keys are the same. The time-to-failure, $n_0$, is large. In fact, $n_0 = \infty$ when the integrity check is perfect, as set forth in Section V.C. The synchrony time for imperfect integrity checks is addressed in Section VI.

An example key replacement algorithm for the sender and the receiver is now described.

1) Key Replacement (the sending party): At the beginning of key epoch i+1, the sending party uses $\lambda^a$ and $k_i^a$ to generate the next key $k_i^a+1$:
   (1) Find the set of possible keys from $k_i^a$: $N=\{n|A(k_i^b,n)>0\}$.
   2) Assign $k_i^a+1=n \in N$ w.p. 1/d After the key is chosen, the sending party uses it to encrypt future messages. The sending party does not explicitly signal any key information to the receiving party.

2) Key Recovery (the receiving party): At the beginning of key epoch i+1, the receiving party starts to receive messages encrypted with a different key. Assume that the session keys were synchronized in the previous epoch, i.e., $k_i^a = k_i^b$. Since $\lambda^b = \lambda^a$, the receiving party knows the transition probabilities of the next keys.

1) Find the set of possible keys from $k_i^a$: $N=\{n|A(k_i^b,n)>0\}$.
2) For each key $n \in N$:
   If $\psi(x_i,n)=1$ then assign $k_i^b+1=n$ and halt.
   Else continue.

Since it is assumed that $k_i^a = k_i^b$ and $\lambda^b = \lambda^a$, the receiving party considers the same replacement keys as the sending party did. The receiving party selects the correct key, assuming that the integrity check works correctly. The case of imperfect integrity checks is described in Section VI.

Assuming epoch synchrony and correctly functioning integrity checks, the receiving party and the sending party will remain in key synchrony, i.e., the time-to-failure $n_0=\infty$.

E. Complexity and Costs

The communication, computation, and memory requirements of an example key replacement method of embodiments of the present invention are now described.

Communication: Aside from the initial synchronization of Markov models, there is no further explicit key replacement messages sent between the sending party and the receiving party. That is, after sharing $\log_2(L)$ bits of information for initialization, the method requires no additional bits to be transmitted over the channel.

In typical networks, synchrony may already be maintained. Consequently, requiring that the sending party and the receiving party remain synchronized adds little to no overhead. Alternatively, if the integrity check works perfectly, the need for synchrony vanishes. The sending party can change the session key at will and the receiving party will be able to detect the change and search for the new key. On the other hand, if the receiving party does not detect a key change, either the integrity check is imperfect or the receiving party has temporarily stopped communicating with the sending party. These cases are treated in Section VI.

Computation: The transmitter only needs to select a key from the set of possible future keys. The receiver, however, needs to check the set of keys until the correct one is found. Thus, the receiver needs to perform between 1 and d decryptions and integrity checks. Since the next key is chosen with equal probability from the set, the receiver will perform d/2 decryptions and integrity checks on average.

Since the key transitions are not stored in memory, there is a computation cost to generate them. As described in Section V, an embodiment of the present invention uses cryptographically secure PRNGs (CSPRNGs), which have higher complexity than non-CS PRNGs. For example, the Blum Blum Shub CSPRNG has complexity equal to RSA. (See L. Blum, M. Blum, and M. Shub, "A Simple Unpredictable Pseudo-Random Number Generator," *SIAM Journal on Computing*, vol. 15, pp. 364-383, May 1986, the entirety of which is incorporated by reference herein.)

Memory: Both the transmitter and the receiver need to have in memory the set of possible future keys. Since there are d possible keys, the minimum storage requirement is d $\log_2(K)$ bits. As described above, this is achievable—i.e., it is not necessary (or possible in most instances) to store the entire set of Markov models in memory.

IV. Random Markov Model: Structure

Since Markov models are used for session key replacement, the structure of the (pseudo-) randomly generated model is of interest. Though the models are deterministic given the particular PRNG used for generation, it is assumed that they are statistically random and unpredictable (as discussed in Section V). Thus, without fully specifying the model, which is infeasible for realistic key sizes, the structure of the model appears random. Accordingly, certain properties of the models cannot be guaranteed, but probabilistic statements can be made. An event occurs with high probability, when it occurs with probability 1 as the K increases without bound.

For any given key, the set of keys that may be chosen in the future should be large so that it is infeasible for an adversary, given reasonable constraints on the adversary's ability, to perform a brute-force attack (i.e., test every key). In other words, it is undesirable to have a situation where choosing a particular key limits the choices of subsequent session keys.

In terms of graph theory, the reachable subspace of K should be large for most keys in K. A key v is reachable from u if there exists a (directed) path from u to v: $u \leadsto v$ The reachable subspace for a key u is therefore the set of all possible v for which $u \leadsto v$.

It is shown below that given any initial key, the reachable keyspace is large, that is, O(K). First, the concept of strongly connected components are introduced. Results from graph theory are used to show that the size of a single giant connected component ("GCC") depends on the branching factor d. (See C. Cooper and A. Frieze, "The size of the largest strongly connected component of a random digraph with a given degree sequence," *Combinatorics, Probability and Computing*, vol. 13, no. 3, pp. 319-337, May 2004, the entirety of which is incorporated by reference herein.) Finally, it is shown that with probability 1, (i) all keys can reach the GCC and (ii) no keys leave the GCC. That is, the random Markov models are guaranteed to give highly random key replacements.

A. Size of the GCC

To facilitate the discussion, the following terms from graph theory are defined: strongly connected; strongly connected components; giant connected component; fan-in; and fan-out.

Definition 3: A digraph S is a strongly connected when there exists directed paths between any randomly chosen pair of vertices u, v∈S:

$$u \leadsto v \quad (10)$$

$$v \leadsto u \quad (11)$$

Definition 4: The strongly connected components (SCCs) of a digraph are the maximal strongly connected subgraphs. For a given digraph, the SCCs may be identified using efficient algorithms such as Tarjan's algorithm (see R. Tarjan, "Depth-first search and linear graph algorithms," *SIAM Journal on Computing*, vol. 1, no. 2, pp. 146-160, 1972, the entirety of which is incorporated by reference herein) or Gabow's algorithm (see J. Cheriyan and K. Mehlhorn, "Algorithms for dense graphs and networks on the random access computer," *Algorithmica*, vol. 15, no. 6, pp. 521-549, June 1996, the entirety of which is incorporated by reference herein).

Definition 5: When the size of a SCC reaches O(K), it is typically referred to as the giant connected component (GCC) since it dominates the other SCCs in size.

The significance of the GCC is that for any given key in the GCC, it can reach any other key of the GCC given enough transitions. When the GCC is large, this implies that there are many keys that can be chosen in the future, which is good for security.

Definition 6: The fan-in of a node u is the set of vertices u for which $u \leadsto v$.

Definition 7: The fan-out of a node u is the set of nodes u for which $u \leadsto v$. The fan-out (or fan-in) of a vertex is large when its size is O(K). Let $L^+$ be the set of vertices with a large fan-out, and let $L^-$ be the set of vertices with a large fan-in.

Intuitively, when a node u has a large fan-out and a distinct node v≠u has a large fan-in, the path $u \leadsto v$ exists with high probability. Thus, nodes that have both large fan-in and large fan-out are likely to be connected. (See C. Cooper and A. Frieze, "The size of the largest strongly connected component of a random digraph with a given degree sequence," *Combinatorics, Probability and Computing*, vol. 13, no. 3, pp. 319-337, May 2004, the entirety of which is incorporated by reference herein.)

Let $\pi^-(\pi^+)$ be the probability that a randomly chosen vertex has a large fan-in (large fan-out). It follows that $|L^-|=\pi^- K$ and $|L^+|=\pi^+ K$. They are the smallest non-negative solutions of $$1 - \pi^- = \sum_i p_i^- (1 - \pi^-)^i \quad (12)$$

$$1 - \pi^+ = \sum_i p_i^+ (1 - \pi^+)^i \quad (13)$$

where $p_i^-(\pi^+)$ is the probability that a key has exactly i incoming (outgoing) transitions. These probabilities are calculated as:

$$p_i^- = \binom{K}{i} p^i (1-p)^{K-i} \quad (14)$$

$$p_i^+ = \begin{cases} 1 & i = d \\ 0 & \text{otherwise} \end{cases} \quad (15)$$

where p is the probability that there exists a transition between a randomly chosen pair of current and next keys. Since each vertex has constant out-degree d, it follows that p=d/K. The in-degree distribution is given by the binomial probability mass function with parameter p.

When d>1, $\pi^-$ has a unique solution in (0,1), and $\pi^+=1$. In other words, a positive fraction of vertices have large fan-in while all vertices have large fan-out (i.e., $|L^+|=K$. Based on the argument above, the size of the GCC is approximately $$|G| \cong |L^- \cap L^+| \quad (16)$$

$$\cong |L^-| + |L^+| - |L^- \cup L^+| \quad (17)$$

$$\cong (\pi^+ + \pi^- - (1 - \psi))K \quad (18)$$

where $$\psi = \sum_{ij} p_{ij} (1 - \pi^-)^i (1 - \pi^+)^j \quad (19)$$

$$= 0 \quad (20)$$

since $\pi^+=1$. Thus, the GCC G is unique with size $$|G| = \pi^- K \quad (21)$$

with probability approaching 1 as K↑∞.

Table 1 shows the theoretical and observed size of the GCC for various branching factors. For each value of d, 100 matrices of size $K=2^{10}$ were generated. The size of the GCC was found using Tarjan's algorithm and averaged over each realization. Shown in Table 1 is the ratio of GCC size to K. The theoretical GCC size matches very well with the empirical evidence. Clearly, increasing d increases the proportion of the GCC, though the gains diminish after d=4.

When the size of the GCC is less than K, the size of the reachable subspace is diminished. In bits, the penalty is $$\text{Penalty}=-\log 2(|G|/K) \quad (22)$$

For example, if the GCC has size $2^9$ but the keyspace has size $2^{10}$, then the penalty is 1 bit. Thus, the keys that are traversed offer the security of a 9-bit key instead of a 10-bit key.

Note the significant decrease in penalty as the branching factor is increased from 2 to 4. Diminishing improvements are observed for larger branching factors.

B. Reachability of the GCC

Since the GCC G is large, any key k E G has a reachable subspace with size O(K) by definition. However, what about those keys that are not in G? In order to guarantee keys that traverse a large space, it is shown that with high probability
  regardless of initial key, the key replacement algorithm eventually chooses members of the GCC, and
  if the current session key is in the GCC, future replacement keys will remain in the GCC.

TABLE 1

GCC Proportion

| Branching Factor | Theory | Empirical | Penalty (bits) |
|---|---|---|---|
| 2 | .7972 | .7972 | .3369 |
| 3 | .9408 | .9404 | .0881 |
| 4 | .9803 | .9801 | .0287 |
| 5 | .9931 | .9932 | .0100 |
| 6 | .9975 | .9977 | .0036 |
| 7 | .9991 | .9990 | .0013 |
| 8 | .9997 | .9997 | .0005 |

First observe that when a key leaves the GCC, it does not have a path that returns to the GCC. To see why, suppose that the path $G \leadsto v$ exists, where $v \notin G$. If a path $v \leadsto G$ exists, then since $G \leadsto v$ this implies that $v \in G$, which is a contradiction. In other words, when the replacement key sequence transitions outside of the GCC it can never return. Therefore, it is shown that once a key from the GCC is chosen, keys outside the GCC are never chosen in the future.

The keys that are not in G are referred to as external. Let $G^-$ be the set of external keys that have a path to G and let $G^+$ be the set of external keys that are reachable from G, i.e., $$G^-=\{u|u \to G\} \quad (23)$$

$$G^+=\{v|G \to v\} \quad (24)$$

Figure 5:
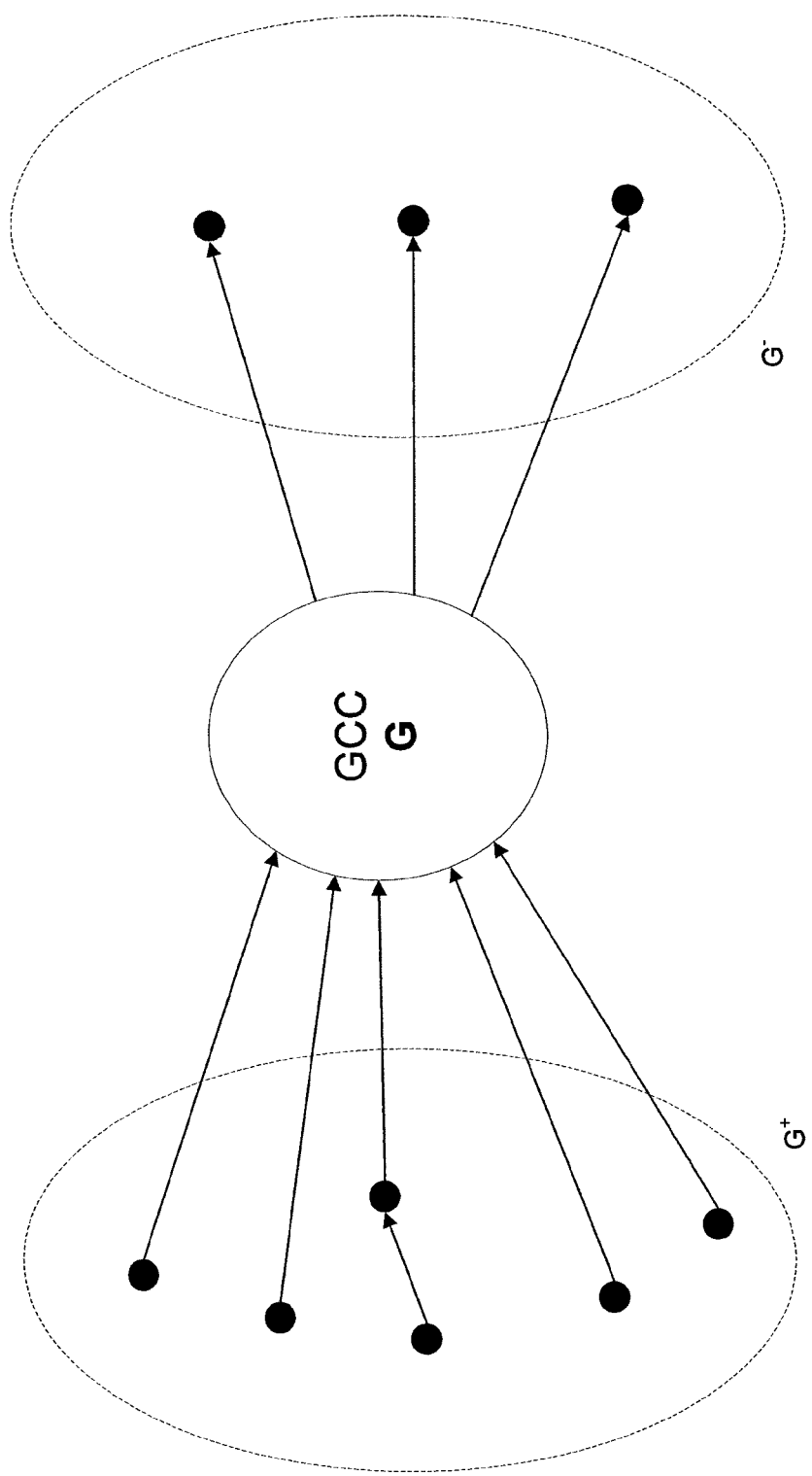
FIG. 5 illustrates an example bowtie digraph connected to a giant connected component, wherein $G^+$ leads into the giant connected component and $G^-$ emanates from the giant connected component.

The resulting set $B=G^- \cup G \cup G^+$ forms a bowtie digraph as shown in FIG. 5. The bows of the graph are formed by two wings: $G^+=L^+ \cap L^-$ and $G^-=\overline{L^+} \cap L^-$.

Recall that $|L^+|=K$ and hence $L^+=K$. Hence $\beta=K$, i.e., the bowtie graph encompasses all vertices in the space. It follows that $\overline{L+}=\emptyset$ and therefore $G^-=\emptyset$. Therefore, any randomly chosen key is either in $G^+$ or $G \cdot \overline{L^+} \cap L^-$ The structure of B yields the following properties:
1) If a key is not in G, then it is in G. Therefore, with probability 1 the current state will eventually be in G. With probability approaching 1 as $K \uparrow \infty$, any randomly chosen key will enter the GCC.
2) Once a key is in the GCC, it will not depart since with probability approaching 1 as $K \uparrow \infty$, $|G^-|=0$.

In terms of session keys, the structure of the random Markov model guarantees that each session key can reach a large subset (O(K)) of the keyspace. Therefore, the session keys that are generated from a key exchange method of embodiments of the present invention will traverse a large space, thereby making the task of the adversary difficult.

V. Security of an Example Key Replacement Method

A key replacement method of embodiments of the present invention has perfect forward secrecy and is resistant to known-key attacks.

Suppose that an adversary is able to discover the long-term key l as well as the session key $k_i^a = k_i^b$. Is the adversary able to recover the past session keys $\{k_0, \ldots, k_{i-1}\}$? While the forward transitions are easy to calculate, by the nature of the construction (Section III), it is not as easy to find the backward transitions. When the adversary does not know about the structure of the Markov model in use, she has no choice but to brute-force search the keyspace to find the possible previous keys. This is the ideal case in terms of security since it offers perfect forward security.

However, since the model is randomly generated, the security afforded by the underlying PRNG is relied upon. If the adversary is able to discover the structure of the PRNG, the adversary is potentially able to discover the prior session keys. Thus, the forward security of the proposed key replacement method relies on the unpredictability of the PRNG. Cryptographically secure PRNGs (CSPRNG) are designed to be unpredictable at the cost of increased computation cost.

Now suppose that an adversary is able to capture only a session key $k_i^a = k_i^b$. What is the adversary able to discover about future session keys or the long-term key? We quantify the adversary's information by equivocation (conditional entropy). It is shown that the following properties about the codebook Λ hold:

$$H(k_{i+}|k_i) \cong H(K) \text{ (Entropy of next key)} \quad 1)$$

$$H(l|k_i) \cong H(\Lambda)$$

where K is the collection of session keys and Λ is the collection of Markov models. That is, given the current session key, little information is revealed about subsequent session keys or the Markov model in use.

The equivocation of the generated keys also relies on the underlying PRNG. To ensure keys with high equivocation, the PRNG output should be statistically random, i.e., be close to uniformly distributed so that there is no skew or bias. However, PRNGs that pass statistical tests are not necessarily sufficient for security purposes. For example, though the digits of it may pass any statistical test for randomness, they are predictable and hence exploitable by any reasonably capable adversary. Thus, the PRNG should not only produce seemingly random output, but also be unpredictable to the adversary.

A. Entropy of Next Key

Given a model and the current key, there are d candidates for the next key. Over all L possible models that are generated from the same PRNG, there are therefore dL candidates uniformly distributed over the K possible keys. The probability of transitioning from key m to key n is therefore $$\frac{1}{dL}\sum_l A^l(m,n) = \frac{1}{dL}|A(m,n)| \quad (25)$$

The entropy is therefore $$H(k_{i+1}|k_i = m) = \sum_n h\left(\frac{1}{dL}|A(m,n)|\right) \quad (26)$$

where (27)

$$h(x) = -x\log_2(x)$$

Since the keys are chosen uniformly over each A, $P(|A(m,n)|=x)$ is approximated by the Poisson distribution $$P(|A(m,n)| = x) = f(x, \bar{x}) \quad (28)$$

$$\frac{\bar{x}^x e^{-\bar{x}}}{x!} \quad (29)$$

where $\bar{x}$ is the expected number of occurrences. In this case, $\bar{x}=dL/K$.

The entropy of the next key can thus be approximated $$H(k_{i+1} = m) = \sum_x E[|A(m,n)| = x|]h\left(\frac{x}{dL}\right) \quad (30)$$

$$= \sum_x Kf(x,\bar{x})h\left(\frac{x}{dL}\right) \quad (31)$$

Figure 6:
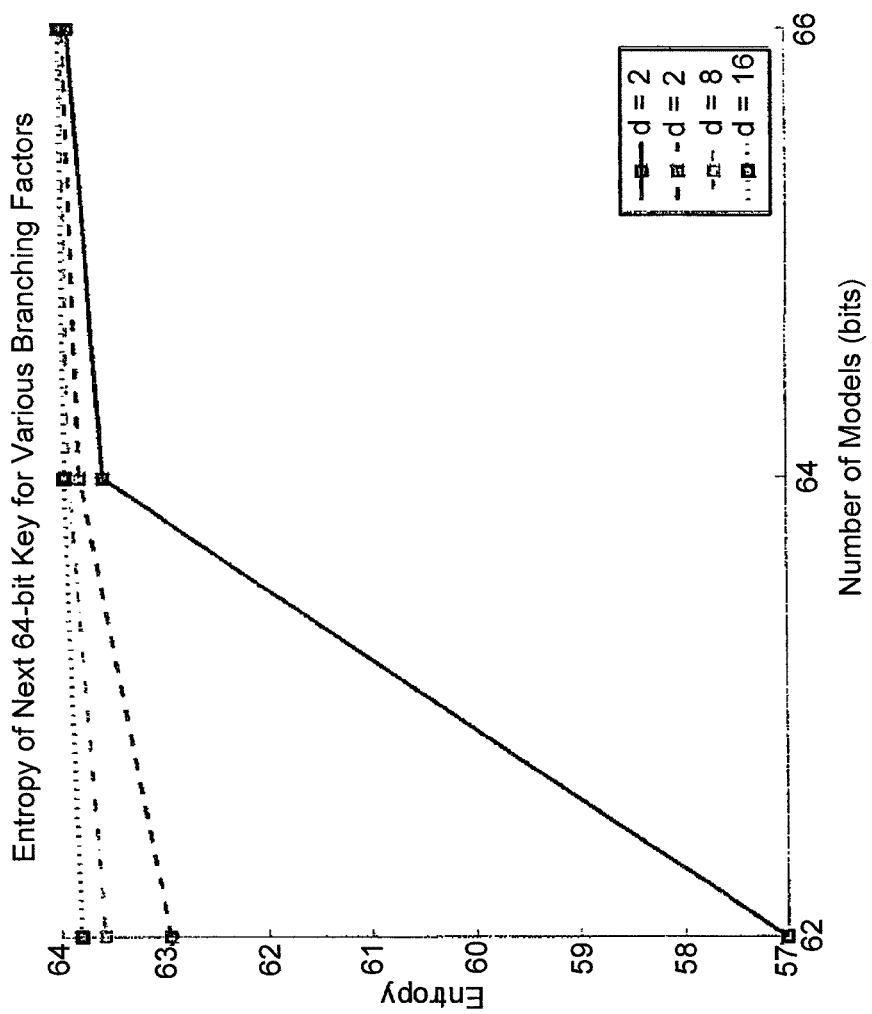
FIG. 6 illustrates the entropy of a next 64-bit key for various branching factors in accordance with an embodiment of the present invention.

FIG. 6 shows that the entropy is close to the maximum when the branching probability is high and the number of models L is high. The critical point is that dL must be greater than K. This ensures that over all the models the possible keys are sufficiently random. Note that with sufficiently many models, the branching factor contributes only a small amount of entropy.

B. Entropy of an Example Random Access Markov Model

The current state should give little information about which model λ is being used. As set forth above, the GCC G has size O(K), and the number of non-zero stationary probabilities $\mu_i$ are also O(K). For large d, $|G| \approx K$.

The key sequence generated using the model forms a Markov chain. Assume that the Markov chain is in steady state. Let the stationary probability of key i under model l be $\mu_i^l$. Then the entropy of the model given the key is $$H(l | k_i) = \sum_l h\left(\frac{u_i^l}{\sum_l u_i^l}\right) \quad (32)$$

Figure 7:
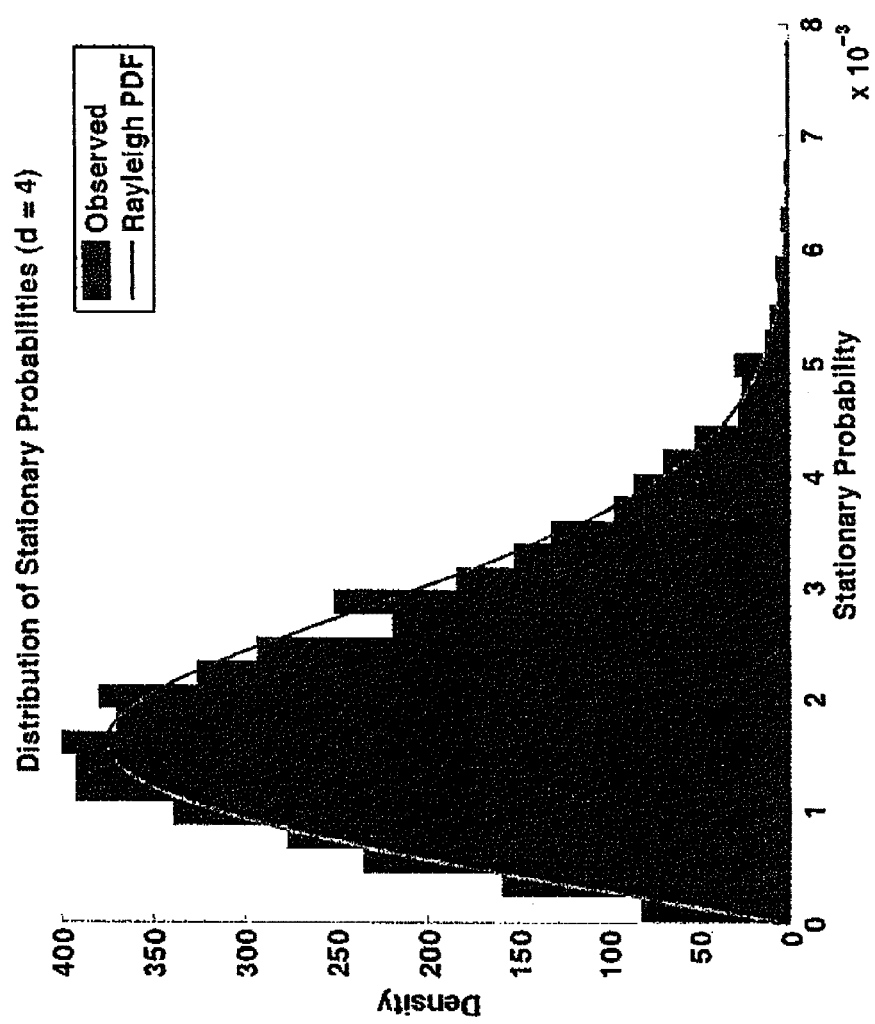
FIG. 7 illustrates that a distribution of stationary probabilities are well approximated with a Rayleigh distribution for small branching factors (e.g., d=4).
Figure 8:
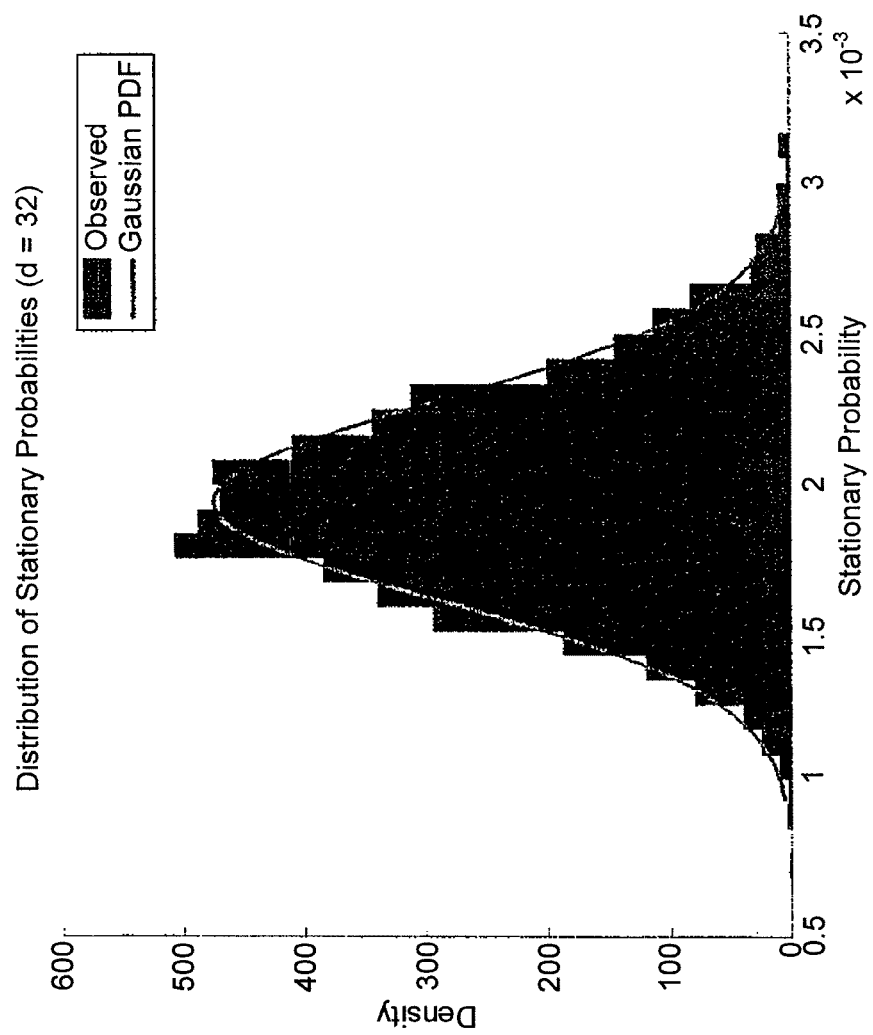
FIG. 8 illustrates that a distribution of stationary probabilities are well approximated with a Gaussian distribution for large branching factors (e.g., d=32).

Experiment illustrates that the stationary probabilities are well approximated by a Rayleigh distribution when d is small and a normal distribution when d is large, as illustrated in FIGS. 7 and 8, respectively. Thus, when there are L independent instances of $\mu_i^l$, they follow this distribution.

Figure 9:
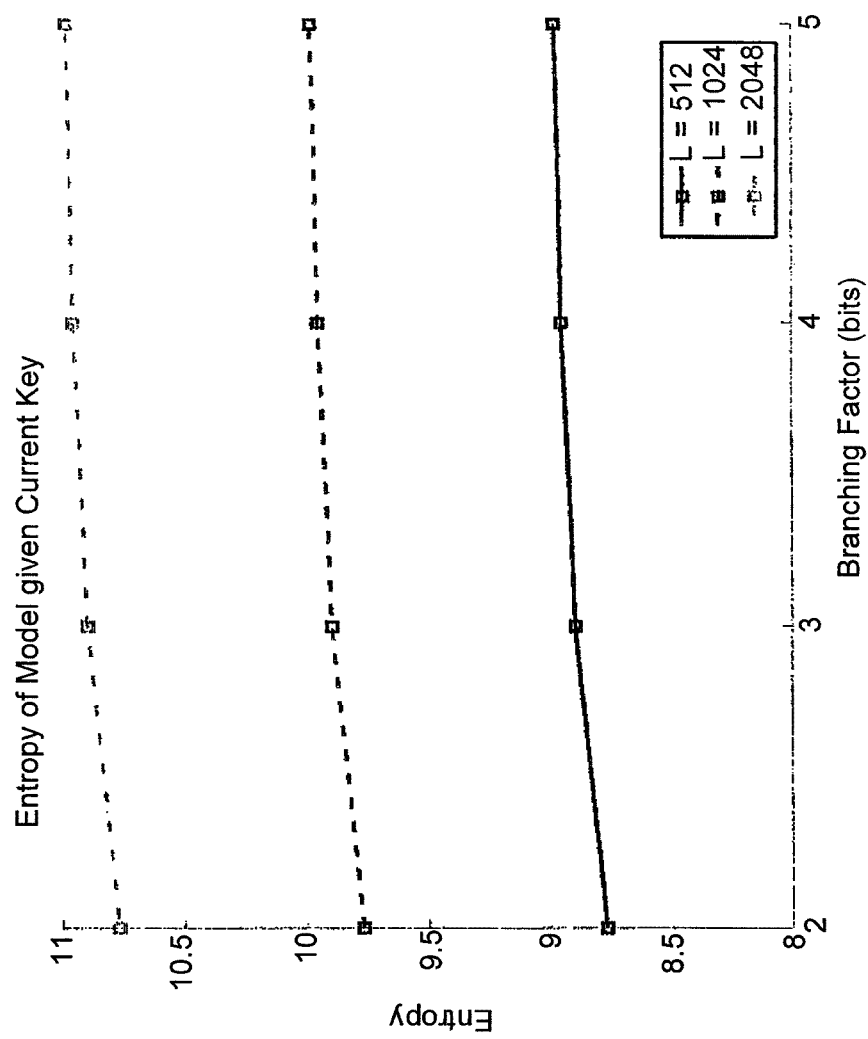
FIG. 9 illustrates the entropy of example Markov models given a current key in accordance with embodiments of the present invention.

FIG. 9 shows that the model entropy is close to the maximum when the branching probability is high and the number of models L is high. Increasing the branching factor improves the model entropy.

C. Entropy Rate

Since the GCC is strongly connected, it is irreducible. With high probability, random digraphs are also a periodic. An irreducible and a periodic Markov chain converges to its unique stationary distribution μ, and the resulting entropy rate is $$H(X) = -\sum_{m,n \in G} \mu_m A_{mn} \log A_{mn} \le \log d \quad (33)$$

with equality when a transition between keys m and n implies that $A_{mn}=1/d$. Thus entropy rate is maximized when future keys are equiprobable.

Note that the calculated entropy rate is for a given Markov model. Given that it is known, the entropy rate is given by equation (33). When the model is not known, the entropy of the next key was shown to be high, near the entropy of the keyspace K (Section V.A).

Having a higher entropy rate is beneficial for security since a model will become associated with many paths rather than only a few. (Consider the multiplicity of paths that arise when d is increased from 1.) This in turn makes it more difficult for an adversary to determine which model is being used. Although an adversary may try to use the Baum-Welch algorithm (see L. R. Welch, "Hidden Markov Models and the Baum-Welch Algorithm," *IEEE Information Theory Society Newsletter*, vol. 53, no. 4, pp. 1, 10-13, December 2003, the entirety of which is incorporated by reference herein), it is not accurate unless the number of observations is very high with respect to size of the state space. Of course, with large keys that will not be the case.

VI. Extension: Imperfect Key Recovery

In Section III, it was assumed that the receiving party is able to determine the correct key without error. This is usually a good approximation. But, this section describes the effects of detection error on a key replacement method in accordance with an embodiment of the present invention.

Suppose that the ciphertext $x_i$ has been encrypted with key $k_i$:

$$x = f_e(s, k_i) \quad (34)$$

When a single key is tested, there are two cases where the key recovery fails.

1) Missed detection: the correct key is tested ($k=k_i$) but fails the check with probability $1-p>0$:

$$\psi(x, k = k_i) = \begin{cases} 0 & w \cdot p \cdot 1 - p \\ 1 & w \cdot p \cdot p \end{cases} \quad (35)$$

(36)

2) False alarm: the wrong key is tested ($k \ne k_i$) but passes the check with probability $\alpha > 0$:

$$\psi(x, k \ne k_i) = \begin{cases} 0 & w \cdot p \cdot 1 - \alpha \\ 1 & w \cdot p \cdot \alpha \end{cases} \quad (37)$$

Recall that the recovery performed by the receiving party (Section III) checks the validity of d keys. It is assumed that the trials have independent outcomes. Considering a set of d keys, there are four possible outcomes.

1) The correct key passes the integrity check (all others fail). This occurs with probability $$Pr[\text{Case } 1] = p(1-\alpha)^{d-1} \quad (38)$$

2) The wrong key passes the integrity check (all others fail). This occurs with probability $$Pr[\text{Case 2}] = (d-1)(1-p)\alpha(1-\alpha)^{d-2} \quad (39)$$

3) No keys pass the integrity check. This occurs with probability $$Pr[\text{Case 3}] = (1-p)(1-a)^{d-1} \quad (40)$$

4) Multiple keys pass the integrity check. This occurs with probability $$Pr[\text{Case 4}] = 1 - Pr[\text{Case 1, 2, or 3}] \quad (41)$$

Looking ahead to Section VI-B, the probability of a correct detection Pr[Case 1] should be sufficiently high, otherwise the sending party and receiving party will lose synchrony quickly. The following section describes a modified key recovery method in accordance with an embodiment of the present invention. This modified key recovery method improves the detection probability in the midst of errors.

A. Extended Recovery Method

In general, a key is used for multiple messages. Rather than determining the replacement key after a single message, consider the utility of using C messages. For the key epoch i, denote the messages using the same key as $x_i^1, x_i^2, \ldots$.

The number of times the check passes is independent for each key. The receiving party tallies the number of times a key passes the check over the C messages, and selects the key that has the most positives.

Again assume that $k_i^a = k_i^b$ and $\lambda^b = \lambda^a$ so that the receiving party knows the transition probabilities to the next key.

1) Find the set of possible keys from $k_i^b$: $N = \{n | A(k_i^b, n) > 0\}$.

2) For each key $n \in N$ $$T[n] = \sum_{c=1}^{C} \psi(x_i^c, n) \quad (42)$$

3) Select $k_{i+1}^b = \arg\max_n T[n]$

The probability that the correct key will be detected c times out of C is given by the binomial probability B(c,C,p). Similarly, for the incorrect keys the probability is B(c,C,$\alpha$). Therefore, since the trials have independent outcomes, the probability that the receiving party chooses the correct key is the probability that the correct key is detected more times than any other key.

$$\tilde{p} = Pr[k_{i+1}^b = k_{i+1}^a] \quad (43)$$

$$= \sum_{c=1}^{C} B(c, C, p) \left( \sum_{d=0}^{c-1} B(d, C, a) \right)^{d-1} \quad (44)$$

Figure 10:
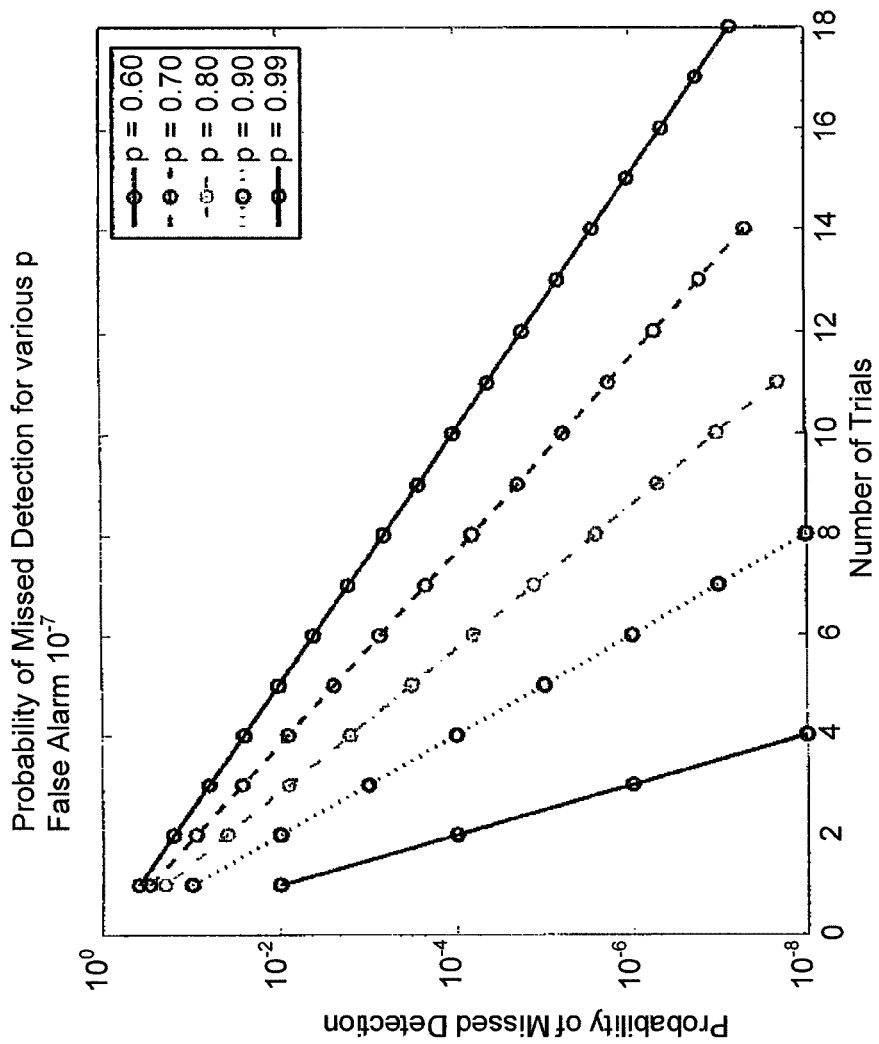
FIG. 10 illustrates the probability of missed detection in accordance with an embodiment of the present invention.

Aside from the detection and false alarm probabilities (p, $\alpha$, respectively), the number of messages C determines the detection probability $\tilde{p}$ of the correct key. FIG. 10 shows that the probability of choosing the wrong key falls exponentially as C increases. Further, the test does not need to consider large C when the detection probability p is high.

B. Synchronization Performance

The probability that the receiving party chooses the incorrect key is $\in = 1 - \tilde{p}$. Thus, the probability that the sending party and the receiving party lose synchrony at epoch $n_0$ is $$Pr(\text{Lost at } n_0) = \in (1-\in)^{n_0-1} \quad (45)$$

The case of interest occurs when the sending party and the receiving party maintain synchrony for at least $n_0$ with a certain probability. That is, $$Pr(n_0 > n) = \sum_{n < n_0} Pr(\text{Lost at } n_0) \quad (46)$$

$$= 1 - (1-\varepsilon)^{n-} \quad (47)$$

$$n = \frac{\log(1 - Pr(n_0 > n))}{\log(1 - \varepsilon)} \quad (48)$$

Figure 11:
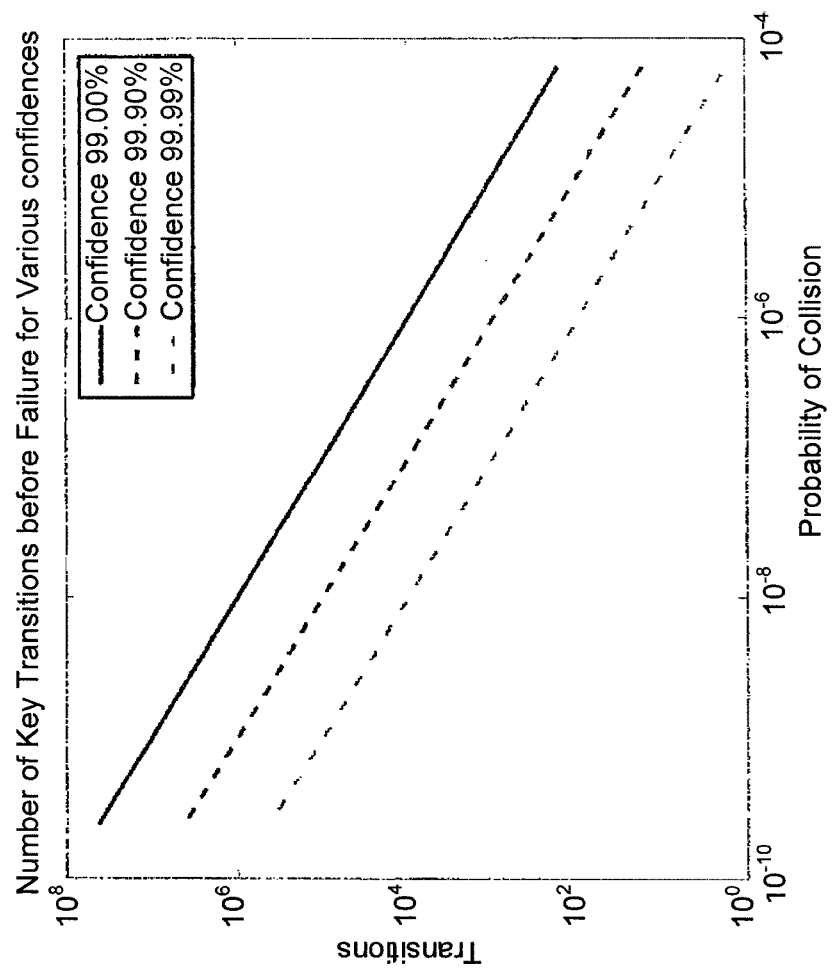
FIG. 11 illustrates the number of key transitions before failure for various confidences.

For example, when $\in = 10^{-4}$, then with probability 99.99% the sending party and the receiving party remain synchronized for at least $9.2 \times 10^4$ keys. FIG. 11 shows the number of key transitions before failure for various confidence levels.

C. Complexity and Costs

When the recovery of the key is extended for C messages, the number of computations and memory requirements increase.

Communication: There is no increase in the number of exchanged messages.

Computation: Since the computations are identical for each message, the computations increase by a factor of C. The final step of selecting the key with the largest score requires negligible computation.

The cost of running the PRNG does not change and is the same as in Section III-D.

Memory: The set of possible keys remains constant over the duration of the test, so there is no additional cost. However, there is the need to keep the tally of how many times each key passes the integrity checks. This requires $\log_2$ (C) bits per key, or $d\log_2$ (C) bits in total. Note that there was no need to keep score in the previous section because exactly one key would satisfy the integrity check.

VII. Applications

Described below are examples of how a key replacement method of embodiments of the present invention may be used. This list is by no means comprehensive and is meant only to provide illustrative possibilities. A person skilled in the relevant art(s) will appreciate that a key replacement method of embodiments of the present invention may be used in other applications in which information is exchanged responsive to a variable that changes over time.

A. Cryptography

A key replacement method of an embodiment of the present invention may be used to replace keys in cryptographic frameworks. In cryptography, all data is assumed to be received without error. That is, the physical layer is abstracted away to provide an error-free channel.

In this case, the correct key always passes the integrity check, so p=1. The probability that an incorrect key passes the check is given by the collision probability $\alpha$. For example, when the integrity check is a 32-bit tag, the probability that two randomly chosen unique keys have the same tag are $2^- \cong 2 \times 100$. Thus, a single message is sufficient to determine the next key with high probability, and the number of transitions to failure is very high (Section VI-B).

B. Frequency Hopped Communications

Rather than restricting methods of embodiments of the present invention to key replacement, such methods may be used in other situations where a variable changes pseudorandomly. One such situation is a frequency-hopped system. In frequency-hopped systems, data is transmitted over different carriers that change at deterministic intervals. Rather than having the data carriers change deterministically as well, a method according to an embodiment of the present invention may be used to select the carrier (or set of carriers). Of particular interest are multi-carrier authentication systems where the placement of the authentication tag may be chosen according to a method of an embodiment of the present invention.

Suppose for simplicity that a frequency-hopped system uses one carrier at a time. The detection and false alarm probabilities of embodiments of the present invention are determined by the effective SNR of the channel. When the carrier changes, the receiver can use an energy detector to scan the set of d possible next carriers and decide which contains a signal and which contains noise only.

The analogue of using multiple messages in the previous situations is to extend the energy detection over time to provide a better estimate of which carrier is being used. Also, the increased complexity lies in the necessity of monitoring d carriers simultaneously. However, this may be less of an issue in software-based radio where much of the computation is done in software, and not hardware.

VIII. Other Key Replacement Methods

An overview of a few important key replacement methods is given below. Weaknesses of these other methods that are overcome by a method in accordance with an embodiment of the present invention are also described.

One of the most efficient key replacement methods is the Point-to-Point Key Update. The receiving party uses the long-term key to encrypt a random-generated session key and sends it to the receiving party. The receiving party uses the long-term key to decrypt and recover the session key. In total, this method requires the exchange of a single message, two symmetric encryptions/decryptions, and has no additional storage requirements beyond that of the long-term key. However, this scheme does not have perfect forward secrecy and fails hard when the long-term key is compromised. There are extensions that use one-way functions and nonces to combat these weaknesses. (See A. J. Menezes, P. C. van Oorschot, and S. A. Vanstone, *Handbook of Applied Cryptography*, CRC Press, 2001, the entirety of which is incorporated by reference herein.)

Instead of using the long-term key to encrypt all the session keys, the idea behind hash chains is to derive past keys from future keys. (See L. Lamport, "Password Authentication with Insecure Communication," *Communications of the ACM*, vol. 24, no. 11, pp. 770-772, 1981, the entirety of which is incorporated by reference herein.) In particular, the current session key $k_i$ is calculated using the next key $k_{i+1}$ and a one-way hash function $H(\cdot)$, i.e., $$k_i = H(k_{i+1}) \tag{49}$$

the sending party and the receiving party generate a chain of hash values derived from the same initial key $k_n$, and begin to use the key $k_0$. As used herein, a function is one-way when it is easy (feasible) to compute but hard (infeasible, given resource constraints) to invert. To replace the key, they simply use the next key $k_1$. However, after n key replacements, the sending party and the receiving party need to re-synchronize and generate another hash chain.

Another method is the Diffie-Helman (DH) key agreement protocol. (See W. Diffie and M. E. Hellman, "New directions in cryptography," *IEEE Trans. Inf. Theory*, vol. 22, no. 6, pp. 644-654, November 1976, the entirety of which is incorporated by reference herein.) This protocol requires the exchange of two messages, two modular exponentiations, and has no additional storage requirements beyond that of the long-term key (in this case, a prime p and a generator of the multiplicative group of integers modulo p). Modular exponentiations are not trivial computations and are much more intensive than symmetric key operations. A major weakness in the basic DH protocol is the lack of authentication which leads to susceptibility to man-in-the-middle attacks. Therefore, in practice the protocol is supplemented with authentication methods such as encrypted key exchange ("EKE") (see S. M. Bellovin and M. Merritt, "Encrypted Key Exchange: Password-Based Protocols Secure Against Dictionary Attacks," in *Proceedings of the IEEE Symposium on Security and Privacy*, May 1992, pp. 72-84, the entirety of which is incorporated by reference herein), thus increasing the complexity of the DH key agreement protocol.

Another protocol is Kerberos. (See MIT (2007, October) Kerberos: The Network Authentication Protocol, the entirety of which is incorporated by reference herein.) The Kerberos protocol is based on the Needham-Schroeder shared-key protocol. (See R. Needham and M. Schroeder, "Using encryption for authentication in large networks of computers," *Communications of the ACM*, vol. 21, pp. 993-999, 1978, the entirety of which is incorporated by reference herein.) The Kerberos protocol uses a trusted authentication server to facilitate key exchange. The authentication server has long-term keys shared individually with the sending party and the receiving party and creates session keys for them to use among themselves. All the encryptions are symmetric and are therefore cheap, but this protocol requires the exchange of more messages because the sending party and the receiving party need to interact with the authentication server. The biggest caveat of course is the existence and cooperation of such an authentication server.

A summary of the requirements of the key replacement methods are shown in Table 2. Note that there is no method that is simultaneously low-complexity, independent of third parties, and secure. A key replacement method in accordance with an embodiment of the present invention is conceptually simple, but due to security requirements may require computationally intensive CSPRNGs. The choice of CSPRNG varies the security of such a key replacement method as well as its computational requirements.

TABLE 2

| Method | Number of Messages | Computation Cost | Third Party? | Secure? |
| --- | --- | --- | --- | --- |
| Point-to-Point | 1 | Inexpensive | No | No |
| Hash Chains | 0 | Inexpensive | No | No |
| Diffie Hellmann with EKE | 2 | Expensive | No | Yes |
| Kerberos | 4 | Inexpensive | Yes | Yes |
| Markov Key Models | 0 | Variable | No | Yes |

IX. An Example System and Method

Figure 12:
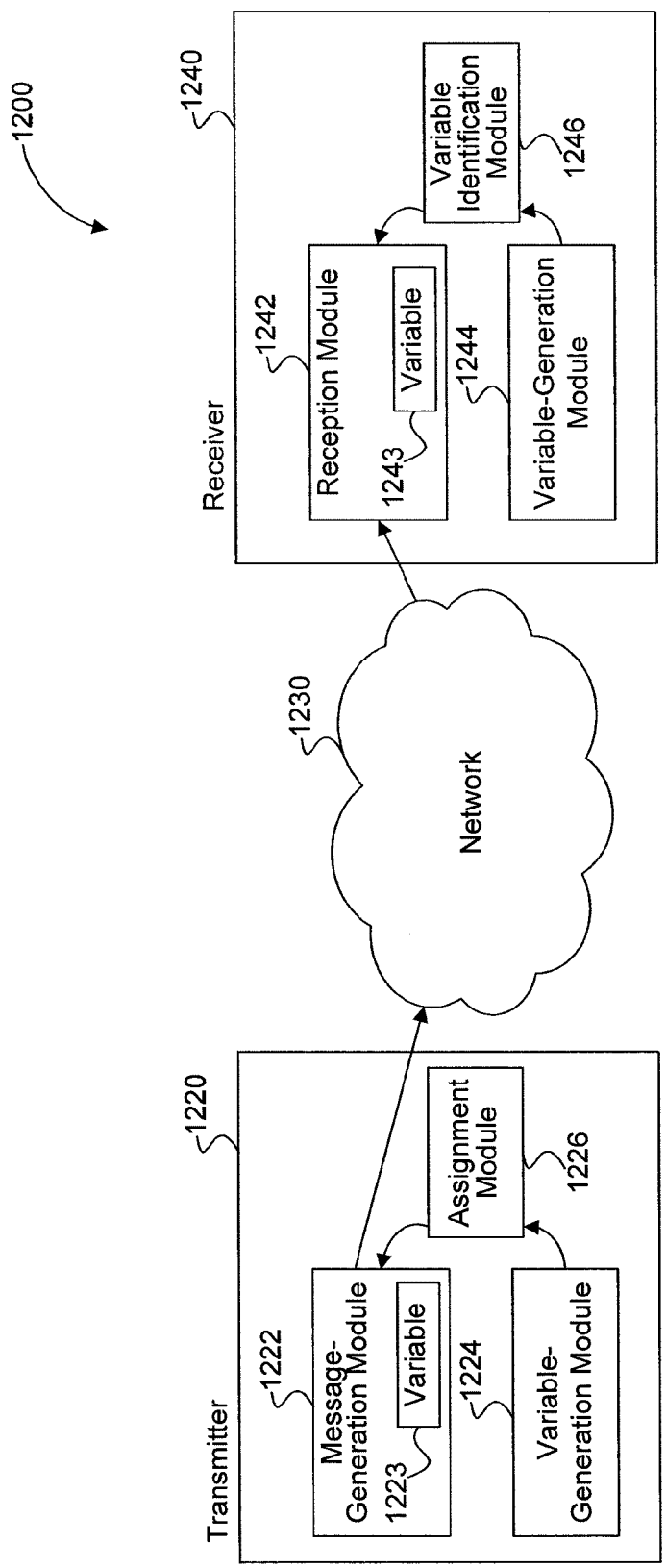
FIG. 12 illustrates an example system, in accordance with an embodiment of the present invention, for sending and receiving information responsive to a variable that changes over time.

FIG. 12 illustrates an example system 1200, in accordance with an embodiment of the present invention, for sending and receiving information responsive to a variable that changes over time. As set forth above, the variable may be, for example, a session key used in cryptography, or a carrier frequency used in frequency-hopped communications systems, or another type of variable upon which information exchange depends, wherein the variable is synchronously changed by a sending party and a receiving party without any communication from the sending party, the receiving party, or any third party regarding how the variable changes.

Example system 1200 includes a transmitter 1220 and a receiver 1240 that are communicatively coupled. Specifically, transmitter 1220 is configured to send a message responsive to a variable that changes over time, and receiver 1240 is configured to receive the message responsive to the variable that changes over time. As illustrated in FIG. 12, transmitter 1220 and receiver 1240 are communicatively coupled, for example, by a network 1230. This is for illustrative purposes only, and not limitation. In alternative embodiments, a direct communication link (e.g., wired or wireless) may exist between transmitter 1220 and receiver 1240. As illustrated in FIG. 12, network 1230 may be any type of network—such as, for example, a wide area network (WAN), a personal area network (PAN), a local area network (LAN), a campus area network (CAN), a metropolitan area network (MAN), a satellite-based network, a wired network, a wireless network, the Internet, another type of network for communicatively coupling a transmitter and a receiver, and/or combinations of the foregoing networks. As described in more detail below, transmitter 1220 and receiver 1240 may comprise any type of device or module for sending and receiving information. In embodiments, for example, transmitter 1220 and receiver 1240 are implemented in hardware, software, firmware, or a combination thereof.

A. Transmitter 1220

Referring to FIG. 12, transmitter 1220 includes a message-generation module 1222, a variable-generation module 1224, and an assignment module 1226.

Message-generation module 1222 is configured to generate a message responsive to variable 1223. In a cryptography application, for example, variable 1223 comprises a session key, and message-generation module 1222 is configured to encrypt the message using the session key. In a frequency-hopped application, for example, variable 1223 comprises a carrier frequency, and message-generation module 1222 is configured to send the message on a current carrier frequency.

Variable-generation module 1224 is configured to generate a plurality of potential next variables according to a random access Markov model in accordance with an embodiment of the present invention. For example, variable-generation module 1224 may generate the plurality of potential next variables based on a current variable (e.g., current session key, current carrier frequency, etc.), a long-term key, and a pseudo-random number generator, as described above with reference to FIG. 3 (see Section III).

Assignment module 1226 is configured to assign one of the plurality of potential next variables as the next variable. In a cryptography application, for example, assignment module 1226 is configured to assign a next session key used to encrypt messages during a next epoch. In a frequency-hopped application, for example, assignment module 1226 is configured to assign a next carrier frequency used to transmit messages during the next epoch. Assignment module 1226 may assign the next variable from among the plurality of potential next variables using a pseudo-random number generator or some other random or pseudo-random process.

After assigning the next variable, message-generation module 1222 is configured to send messages responsive to the next variable.

B. Receiver 1240

Referring to FIG. 12, receiver 1240 includes a reception module 1242, a variable-generation module 1244, and a variable identification module 1246.

Reception module 1242 is configured to receive messages from transmitter 1220 responsive to a variable 1243. In a cryptography application, for example, variable 1243 comprises a current session key, and reception module 1242 is configured to decrypt the message using the current session key. In a frequency-hopped application, for example, variable 1243 comprises a current carrier frequency, and reception module 1242 is configured to receive the message on the current carrier frequency. In an initial epoch, variable 1223 (used by transmitter 1220 to provide the message) and variable 1243 (used by receiver 1240 to receive the message) are synchronized. In each subsequent epoch, variable 1223 and variable 1243 remain in synchrony based on transmitter 1220 and receiver 1240 independently generating variable 1223 and variable 1243, respectively.

For example, variable-generation module 1244 is configured to generate a plurality of potential next variables according to a random access Markov model in accordance with an embodiment of the present invention. For example, variable-generation module 1244 may generate the plurality of potential next variables based on a current variable (e.g., current session key, current carrier frequency, etc.), a long-term key, and a pseudo-random number generator, as described above with reference to FIG. 3 (see Section III).

Variable-identification module 1246 is configured to identify, from among the plurality of potential next variables, the variable that is being used by transmitter 1220 to provide a message during a current epoch. For example, variable-identification module 1246 is configured to implement a integrity check to identify the next variable. As set forth above, the integrity check may comprise, for example, (i) a check sum (e.g., cyclic redundancy check) of a message, (ii) a plurality of check sums of a plurality of messages, (iii) an energy-detection scheme of a carrier frequency, or (iv) some other scheme for determining whether the next variable 1243 identified by variable-identification module 1246 of receiver 1240 is in synchrony with the next variable 1223 assigned by assignment module 1226 of transmitter 1220.

After identifying the next variable, reception module 1242 is configured to receive messages responsive to the next variable.

C. Example Methods

Figure 13:
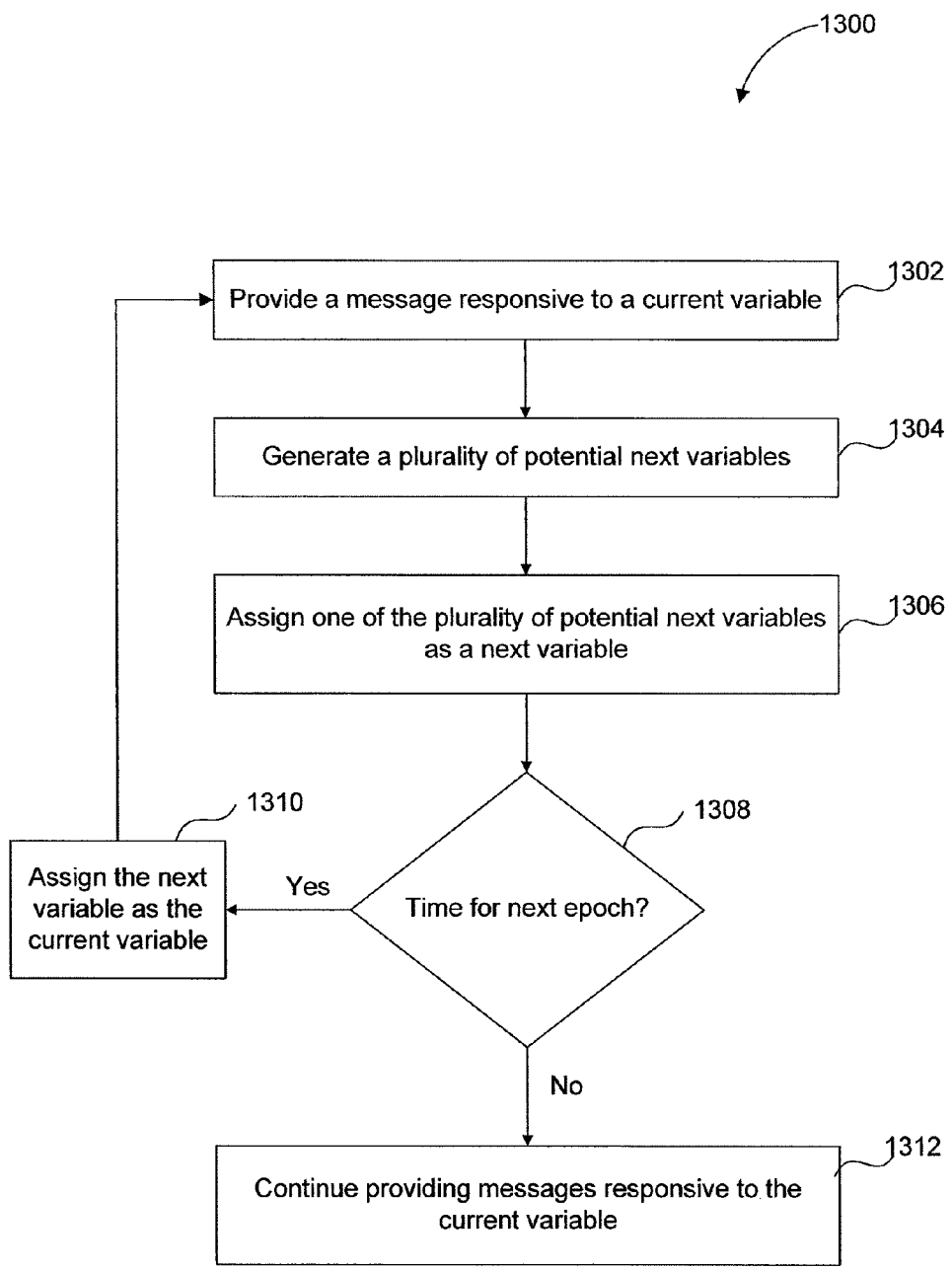
FIG. 13 illustrates an example method, in accordance with an embodiment of the present invention, for sending information responsive to a variable that changes over time.

FIG. 13 illustrates an example method 1300 for providing information responsive to a variable that changes over time in accordance with an embodiment of the present invention. Referring to FIG. 13, method 1300 begins at a step 1302 in which a message is provided responsive to a current variable during a first epoch. For example, the message may be provided by message-generation module 1222 of transmitter 1220.

In a step 1304, a plurality of potential next variables are generated according to a random access Markov model in accordance with an embodiment of the present invention. For example, the plurality of potential next variables may be generated based on a current variable (e.g., current session key, current carrier frequency, etc.), a long-term key, and a pseudo-random number generator, as described above with reference to FIG. 3 (see Section III). In an embodiment, step 1304 is implemented, for example, by variable-generation module 1224 of transmitter 1220.

In a step 1306, one of the plurality of potential next variables is assigned as a next variable to be used during a next epoch. The next variable may be assigned from among the plurality of potential next variables using a pseudo-random number generator or some other random or pseudo-random process. In an embodiment, step 1306 is implemented, for example, by assignment module 1226 of transmitter 1220.

In a step 1308, it is determined whether it is time for a next epoch. In an embodiment, a transition from one epoch to another occurs at fixed intervals of time. In another embodiment, transitions between epochs occur at random (or pseudo-random) time intervals. If in step 1308 it is determined that it is not time for an epoch transition, then messages may continue to be provided responsive to the current variable, as indicated in a step 1312.

If, on the other hand, it is determined in step 1308 that it is time for an epoch transition, then the next variable (assigned in step 1306) is assigned as the current variable, as indicated in a step 1310. Flow of method 1300 then proceeds back to step 1302.

Figure 14:
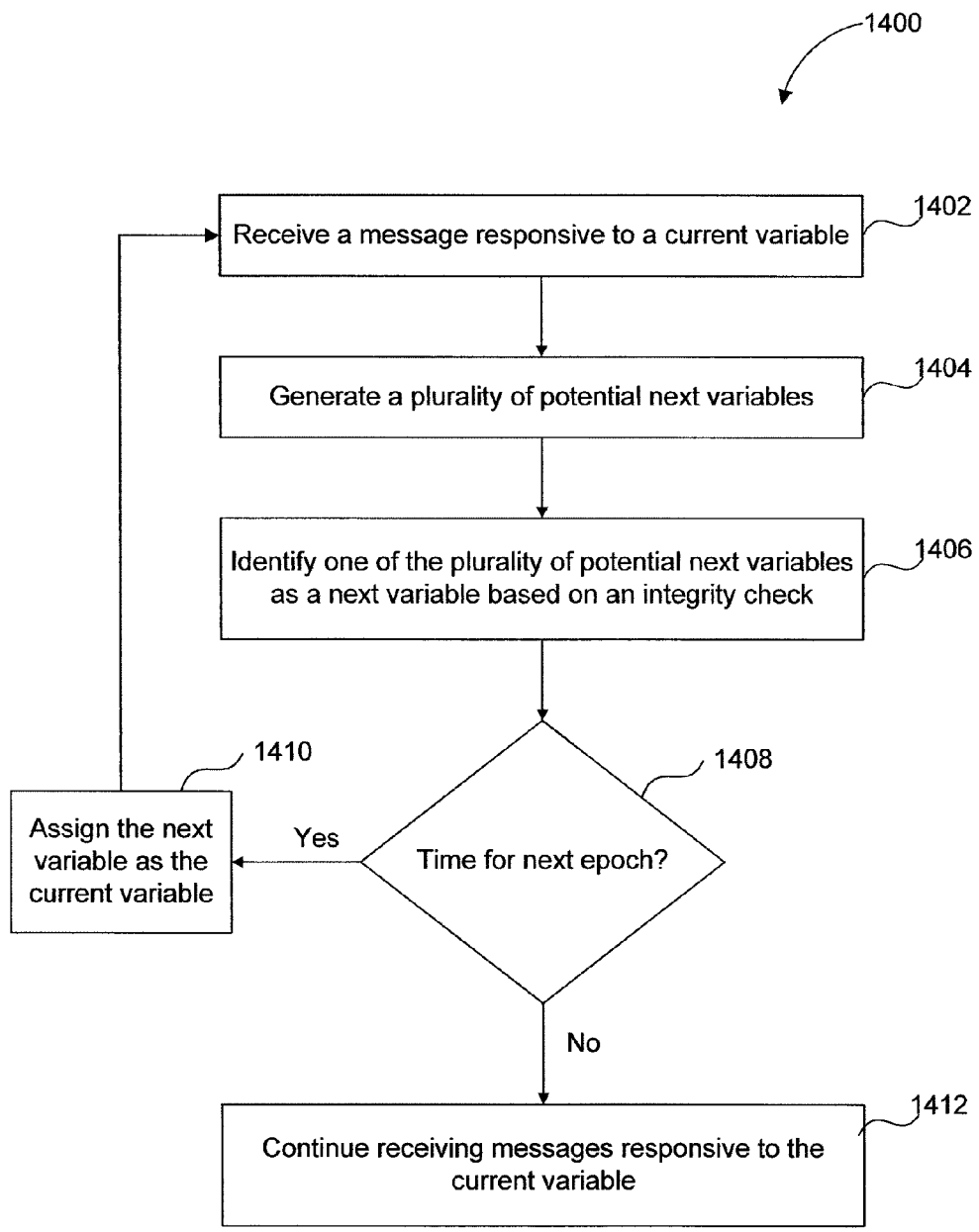
FIG. 14 illustrates an example method, in accordance with an embodiment of the present invention, for receiving information responsive to a variable that changes over time.

FIG. 14 illustrates an example method 1400 for receiving information responsive to a variable that changes over time in accordance with an embodiment of the present invention. Referring to FIG. 14, method 1400 begins at a step 1402 in which a message is received responsive to a current variable during a first epoch. For example, the message may be received by reception module 1242 of receiver 1240.

In a step 1404, a plurality of potential next variables are generated according to a random access Markov model in accordance with an embodiment of the present invention. For example, the plurality of potential next variables may be generated based on a current variable (e.g., current session key, current carrier frequency, etc.), a long-term key, and a pseudo-random number generator, as described above with reference to FIG. 3 (see Section III). In an embodiment, step 1404 is implemented, for example, by variable-generation module 1244 of receiver 1240.

In a step 1406, one of the plurality of potential next variables is identified as a next variable to be used during a next epoch. The next variable may be identified from among the plurality of potential next variables using an integrity check. As set forth above, the integrity check may comprise, for example, (i) a check sum (e.g., cyclic redundancy check) of a message, (ii) a plurality of check sums of a plurality of messages, (iii) an energy-detection scheme of a carrier frequency, or (iv) some other scheme for determining whether the next variable is in synchrony with a next variable used to provide a subsequent message. In an embodiment, step 1406 is implemented, for example, by variable-identification module 1246 of receiver 1240.

In a step 1408, it is determined whether it is time for a next epoch. In an embodiment, a transition from one epoch to another occurs at fixed intervals of time. In another embodiment, transitions between epochs occur at random (or pseudo-random) time intervals. For example, it may be determined that messages can no longer be received using the current variable. If in step 1408 it is determined that it is not time for an epoch transition, then messages may continue to be received responsive to the current variable, as indicated in a step 1412.

If, on the other hand, it is determined in step 1408 that it is time for an epoch transition, then the next variable (assigned in step 1406) is assigned as the current variable, as indicated in a step 1410. Flow of method 1400 then proceeds back to step 1402.

X. Example Computer System and Software Implementation

Figure 15:
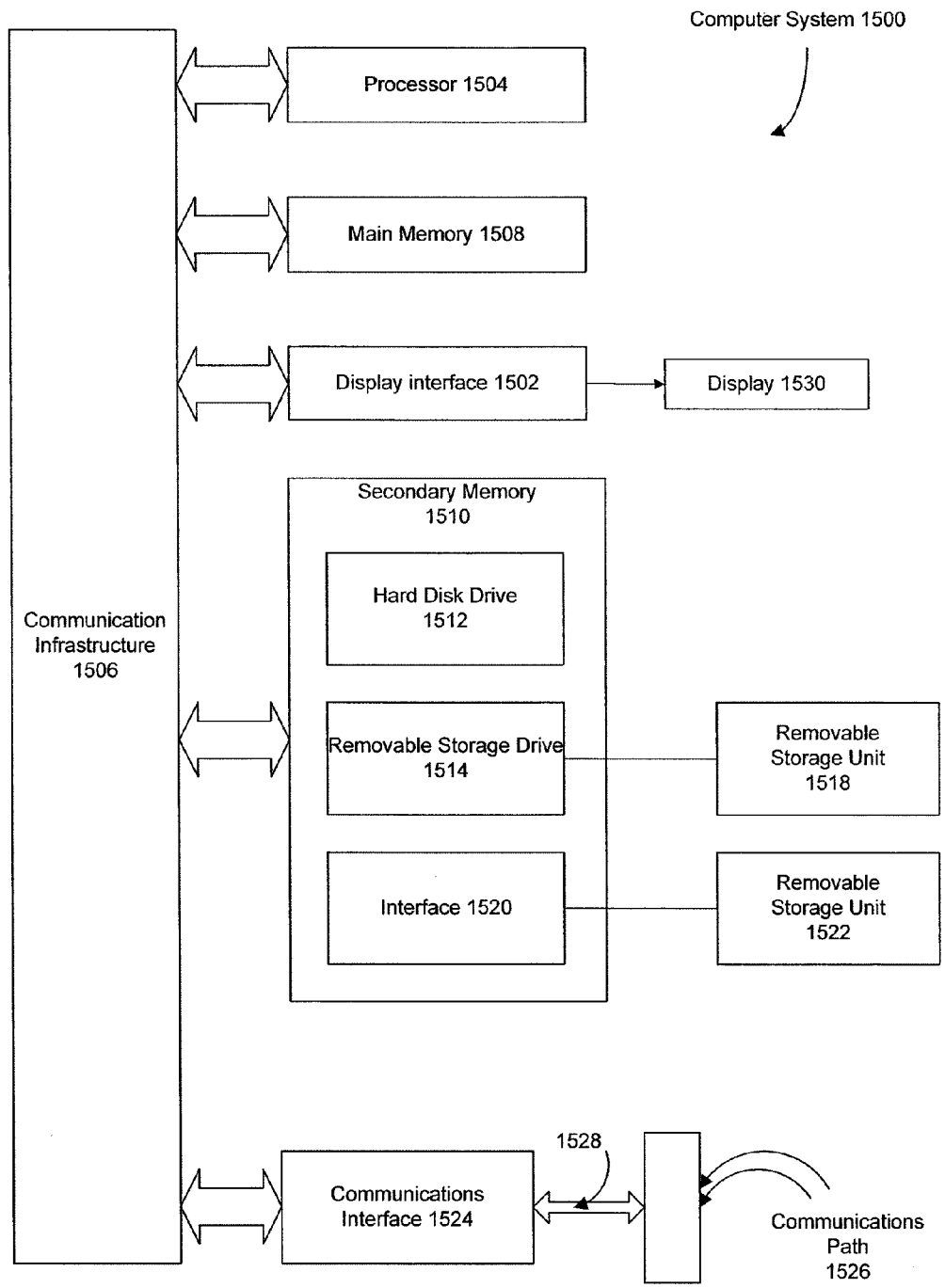
FIG. 15 illustrates an example computer system in accordance with an embodiment of the present invention.

Various aspects of the present invention—such as, transmitter 1220, receiver 1240, method 1300, and/or method 1440—can be implemented by software, firmware, hardware, or a combination thereof. FIG. 15 illustrates an example computer system 1500 in which an embodiment of the present invention, or portions thereof, can be implemented as computer-readable code. Various embodiments of the invention are described in terms of this example computer system 1500. After reading this description, it will become apparent to a person skilled in the relevant art how to implement the invention using other computer systems and/or computer architectures.

Computer system 1500 includes one or more processors, such as processor 1504. Processor 1504 can be a special purpose or a general purpose processor. Processor 1504 is connected to a communication infrastructure 1506 (for example, a bus or network).

Computer system 1500 includes a display interface 1502. Display interface 1502 is coupled to a display device 1530 (such as, a liquid-crystal display, a cathode-ray tube display, a plasma screen display, or some other type of display).

Computer system 1500 also includes a main memory 1508, preferably random access memory (RAM), and may also include a secondary memory 1510. Secondary memory 1510 may include, for example, a hard disk drive 1512 and/or a removable storage drive 1514. Removable storage drive 1514 may comprise a floppy disk drive, a magnetic tape drive, an optical disk drive, a flash memory, or the like. The removable storage drive 1514 reads from and/or writes to a removable storage unit 1518 in a well known manner. Removable storage unit 1518 may comprise a floppy disk, magnetic tape, optical disk, etc. which is read by and written to by removable storage drive 1514. As will be appreciated by persons skilled in the relevant art(s), removable storage unit 1518 includes a computer usable storage medium having stored therein computer software and/or data.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

Computer system 1500 may also include a communications interface 1524. Communications interface 1524 allows software and data to be transferred between computer system 1500 and external devices. Communications interface 1524 may include a modem, a network interface (e.g., an Ethernet card), a communications port, a PCMCIA slot and card, or the like. Software and data transferred via communications interface 1524 are in the form of signals 1528 which may be electronic, electromagnetic, optical, or other signals capable of being received by communications interface 1524. These signals 1528 are provided to communications interface 1524 via a communications path 1526. Communications path 1526 carries signals 1528 and may be implemented using wire or cable, fiber optics, a phone line, a cellular phone link, an RF link or other communications channels.

In this document, the terms "computer program medium" and "computer usable medium" are used to generally refer to media such as removable storage unit 1518, removable storage unit 1522, a hard disk installed in hard disk drive 1512, and signals 1528. Computer program medium and computer usable medium can also refer to memories, such as main memory 1508 and secondary memory 1510, which can be memory semiconductors (e.g. DRAMs, etc.). These computer program products are means for providing software to computer system 1500.

Computer programs (also called computer control logic) are stored in main memory 1508 and/or secondary memory 1510. Computer programs may also be received via communications interface 1524. Such computer programs, when executed, enable computer system 1500 to implement embodiments of the present invention as discussed herein, such as method 1300 (FIG. 13) and method 14 (FIG. 14). Accordingly, such computer programs represent controllers of the computer system 1500. Where embodiments of the invention are implemented using software, the software may be stored in a computer program product and loaded into computer system 1500 using removable storage drive 1514, interface 1520, hard drive 1512 or communications interface 1524.

XI. Conclusion

Disclosed herein is a key replacement method that exploits the randomness of Markov Models to efficiently provide fresh keys to users. This method is shown to generate highly random keys while remaining lightweight in terms of communication and storage costs. The security of this method depends on the underlying CSPRNG and generally is improved at the cost of increased computational requirements. This method has perfect forward secrecy as well as resistance to known-key attacks. As disclosed herein, the usefulness of this method is not restricted to keys, but extends to any variable that is changes in a synchronous manner between a sending party and a receiving party. For example, this method can apply to frequency-hopped communications systems.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method, implemented in a computing device having at least one processor, for sending information responsive to a variable that changes over time, wherein the variable is not provided to a receiving party, the method comprising:
    (a) providing, via a transmitter, a message responsive to a current variable during a first time period;
    (b) generating a plurality of potential next variables to be used during a second time period based on a transition function that specifies a transition probability from the current variable to other variables, wherein the transition probability from the current variable to each potential next variable is greater than zero, wherein the generating is performed by one or more of the at least one processor;
    (c) assigning one of the plurality of potential next variables to be a next variable during the second time period, wherein the assigning is performed by one or more of the at least one processor; and
    (d) providing, via the transmitter, a subsequent message responsive to the next variable during the second time period, wherein the subsequent message includes an integrity check identifying the next variable in the plurality of potential next variables.

2. The method of claim 1, wherein the generating in (b) comprises:
    pseudo-randomly generating a string of numbers based on the current variable and a long-term variable; and
    selecting contiguous groups of numbers from the string of numbers as the plurality of potential next variables, wherein each group of numbers comprises one of the potential next variables.

3. The method of claim 1, wherein the current variable comprises a current key, and wherein the providing in (a) comprises encrypting and sending the message using the current key.

4. The method of claim 3, wherein the next variable comprises a next key, and wherein the providing in (d) comprises encrypting and sending the subsequent message using the next key.

5. The method of claim 1, wherein the current variable comprises a current carrier frequency, and wherein the providing in (a) comprises transmitting the message over the current carrier frequency.

6. The method of claim 5, wherein the next variable comprises a next carrier frequency, and wherein the providing in (d) comprises transmitting the subsequent message over the next carrier frequency.

7. A method, implemented in a computing device having at least one processor, for receiving information responsive to a variable that changes over time, wherein the variable is not provided to a receiving party, the method comprising:
    (a) receiving, via a receiver, a message responsive to a current variable during a first time period;
    (b) generating a plurality of potential next variables to be used during a second time period based on a transition function that specifies a transition probability from the current variable to other variables, wherein the transition probability from the current variable to each potential next variable is greater than zero, wherein the generating is performed by one or more of the at least one processor;
    (c) identifying a next variable based on an integrity check of each potential next variable during the second time period, wherein the identifying is performed by one or more of the at least one processor; and
    (d) receiving, via the receiver, a subsequent message responsive to the next variable during the second time period.

8. The method of claim 7, wherein the generating in (b) comprises:
    pseudo-randomly generating a string of numbers based on the current variable and a long-term variable; and
    selecting contiguous groups of numbers from the string of numbers as the plurality of potential next variables, wherein each group of numbers comprises one of the potential next variables.

9. The method of claim 7, wherein the current variable comprises a current key, wherein the plurality of potential next variables comprise a plurality of potential next keys, wherein the receiving in (a) comprises decrypting the message using the current key, and wherein the next variable comprises a next key.

10. The method of claim 9, wherein the identifying in (c) comprises:
    computing a check sum based on each potential next key and the message or the subsequent message, wherein the next key is identified as one of the plurality of potential next keys for which the check sum is equal to a predetermined value.

11. The method of claim 9, wherein the identifying in (c) comprises:
    identifying the next key based on an integrity check based on a plurality of subsequently received messages and each potential next key.

12. The method of claim 11, wherein the identifying a next key based on an integrity check between the plurality of subsequently received messages and each potential next key comprises:

computing a check sum between each potential next key and each of the plurality of subsequently received messages, resulting in a corresponding plurality of check sums for each respective potential next key;

for each respective potential next key, computing a summation of the corresponding plurality of check sums; and identifying the next key as one of the plurality of potential next keys for which the summation is a greatest value.

13. The method of claim 7, wherein the current variable comprises a current carrier frequency, and wherein the receiving in (a) comprises receiving a message transmitted over the current carrier frequency.

14. The method of claim 13, wherein the generating in (b) comprises generating a plurality of potential next carrier frequencies based on a transition function that specifies a transition probability from the current carrier frequency to other carrier frequencies, wherein the transition probability from the current carrier frequency to each potential next carrier frequency is greater than zero.

15. The method of claim 14, wherein the identifying in (c) comprises identifying a next carrier frequency based on an integrity check of each potential next carrier frequency.

16. The method of claim 15, wherein the integrity check comprises energy detection of each potential next carrier frequency to determine which includes a signal and which includes only noise.

17. The method of claim 15, wherein the integrity check comprises energy detection of each potential next carrier frequency over a predetermined time interval to determine which includes a signal and which includes only noise.

18. A receiver system for receiving information responsive to the variable that changes over time, wherein the variable is not provided to the receiver system, wherein the receiver system comprises:

a processor device configured to:
receive, via a communications interface, a current message responsive to a current variable, generate a plurality of potential next variables based on a transition function that specifies the transition probability from the current variable to other variables,
identify a next variable based on an integrity check of each potential next variable, and
receive the subsequent message responsive to the next variable.

19. The receiver system of claim 18, wherein the processor is further configured to:
generate the plurality of potential next variables based on a random access model.

20. The receiver system of claim 19, wherein the plurality of potential next variables correspond to states in the random access model.

* * * * *